(12) United States Patent
Cooper

(10) Patent No.: US 8,237,466 B2
(45) Date of Patent: Aug. 7, 2012

(54) DEVICE AND METHOD FOR ENABLING MULTI-VALUE DIGITAL COMPUTATION AND CONTROL

(76) Inventor: Benjamin J. Cooper, Bloomington, CA (US)

( * ) Notice: Subject to any disclaimer, the term of this patent is extended or adjusted under 35 U.S.C. 154(b) by 1220 days.

(21) Appl. No.: 11/852,544

(22) Filed: Sep. 10, 2007

(65) Prior Publication Data

US 2008/0147769 A1   Jun. 19, 2008

Related U.S. Application Data

(63) Continuation-in-part of application No. 11/465,853, filed on Aug. 21, 2006.

(51) Int. Cl.
*H03K 19/00* (2006.01)
*H03M 7/34* (2006.01)

(52) U.S. Cl. ............... 326/59; 326/60; 341/51; 341/56; 375/286; 375/300; 375/334

(58) Field of Classification Search .............. 326/59–60; 341/51, 56, 899; 375/293, 334, 353
See application file for complete search history.

(56) References Cited

U.S. PATENT DOCUMENTS

| | | | | |
|---|---|---|---|---|
| 5,715,414 | A | * | 2/1998 | Shintomi ....................... 375/334 |
| 5,825,825 | A | * | 10/1998 | Altmann et al. ............... 375/293 |
| 5,963,053 | A | * | 10/1999 | Manohar et al. ................ 326/60 |
| 7,212,580 | B2 | * | 5/2007 | Hietala et al. .................. 375/293 |
| 7,355,532 | B2 | * | 4/2008 | Kim ................................. 341/56 |
| 7,456,778 | B2 | * | 11/2008 | Werner et al. ................. 341/899 |
| 7,653,165 | B2 | * | 1/2010 | Casper et al. ................. 375/353 |
| 7,864,079 | B1 | * | 1/2011 | Lablans ........................... 341/51 |
| 2005/0286642 | A1 | * | 12/2005 | Kim ............................. 375/242 |

\* cited by examiner

*Primary Examiner* — Vibol Tan

(57) ABSTRACT

Hardware and processes are provided for efficient interpretation of multi-value signals. The multi-value signals have a first voltage range with is used to indicate multiple numerical or logical values, and a second voltage range that is used to provide control functions. In one example, the multi-value circuitry is arranged as a set of rows and columns, which may be cascaded together. The control function can be implemented to cause portions of rows, columns, or cascaded connections to be powered off, thereby saving power and enabling more efficient operation.

15 Claims, 20 Drawing Sheets

DEVICE AND METHOD FOR ENABLING MULTI-VALUE DIGITAL COMPUTATION AND CONTROL

This application is a continuation-in-part to U.S. patent application Ser. No. 11/465,853, Aug. 21, 2006 entitled "Device and Method for Enabling Multi-Value Digital Computation", which is incorporated herein in its entirety.

BACKGROUND

1. Field

The present invention relates to circuits and processes for multi-value computation. More particularly, the invention relates to circuits and processes that enable large scale multi-value computation and control.

2. Description of Related Art

Computers are used to enhance many aspects of everyday life. Computers are used in many products to augment functionality and provide users with improved service. For example, computers in cars can help monitor the maintenance necessary to maintain the vehicle in proper driving condition, help direct drivers to their destinations, and perform many other functions to enhance the user experience.

The ability of a computer to improve the experience of users is limited by the functional capacity of the computer. The functional capacity of computers is dependent on their circuitry. Traditionally, increasing functional capacity of binary circuits has been accomplished by means such as reducing the size of circuit components, adding more components to the circuit, and increasing clock speeds to hasten the computation process. The cost of increasing the functionality of circuits in these ways is significant and trade-offs must be made between cost and performance. In addition, increasing the amount of circuitry generally increases the power consumption. Particularly in applications where power and space are limited, increasing the functionality of computers is a difficult problem.

Non-binary computation may provide an alternative means to improve the functionality of computers at a lower price than traditional means of improving binary circuitry. However, traditional implementations of multi-value digital circuitry have suffered from issues such as excessive power consumption and lack of functionality comparable to binary circuits. Improved multi-value computation could provide an inexpensive means to improve the functionality of computers and enhance the experience of consumers who use them.

SUMMARY

The present invention provides hardware and processes for efficient interpretation of multi-value signals. The multi-value signals have a first voltage range with is used to indicate multiple numerical or logical values, and a second voltage range that is used to provide control functions. In one example, the multi-value circuitry is arranged as a set of rows and columns, which may be cascaded together. The control function can be implemented to cause portions of rows, columns, or cascaded connections to be powered off, thereby saving power and enabling more efficient operation.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
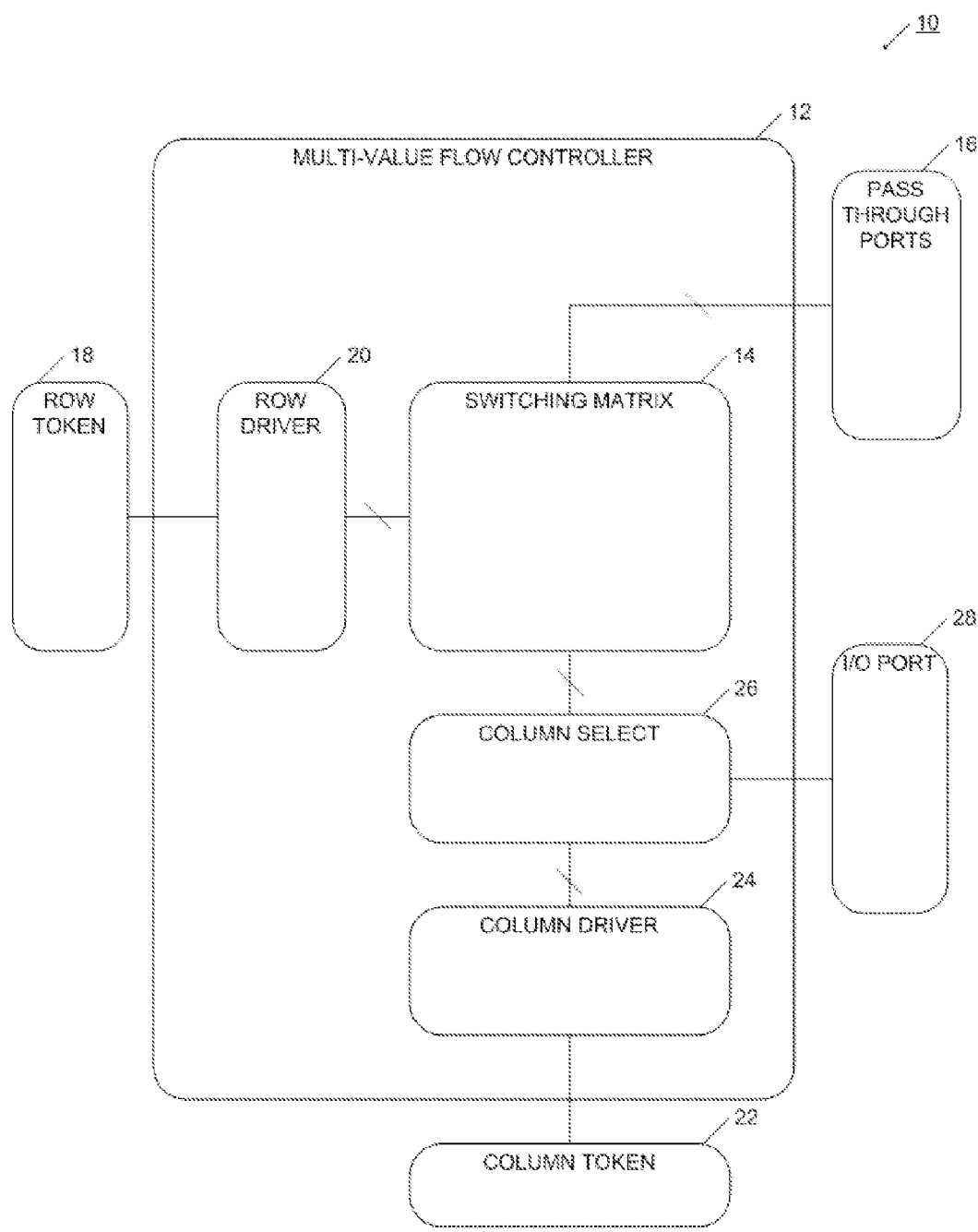
FIG. 1 is a block diagram of a system for enabling general purpose multi-value computation in accordance with the present invention.

Referring now to FIG. 1, system 10 for enabling general purpose multi-value computing is illustrated. Advantageously, multi-value circuits offer the potential of a significant reduction in transistor count over binary circuits. Reducing the transistor count results in smaller circuits that are less expensive to produce but have all the functionality of their binary equivalents. Further, less transistors means less wiring. Less wiring reduces problems with cross-talk between lines and can simplify the fabrication process. Historically, the implementation of multi-valued circuits has suffered from power consumption problems. Further, it has been difficult to implement multi-value circuitry functionally equivalent to generic binary circuits. Advantageously the present systems enable multi-valued circuitry that can perform the equivalent operations of binary circuitry in a power efficient manner. More particularly, the present systems enable data steering, computation, and control in a power efficient manner.

System 10 is used to direct the flow of multi-value signals and acts a building block for multi-value logic circuits. System 10 has multi-value flow controller (MVFC) 12. Generally, MVFC 12 is used to drive one of many multi-value signals on to a single line or to drive one multi-valued signal on to one of many lines. MVFC 12 has switching matrix (SM) 14 and pass through ports 16. In one example, system 10 operates in base four (quad) logic. It will be appreciated that while one or more examples may reference quad logic, the present systems may be practiced in other bases including, but not limited to, octal, decimal, base 32, base 64, and others. In quad logic, pass through ports 16 constitute sixteen lines, each capable of carrying a multi-value signal. Pass through signals 16 are associated with the intersection of rows and columns of SM 14. In the example of quad logic, SM 14 has four rows and four columns. Each of the sixteen pass through signals 16 is associated with the intersection of a row and column in SM 14. SM 14 will be discussed in greater detail below.

System 10 also has row token 18 and row driver 20. It will be appreciated that a token is a signal holding one of two or more possible values. In one example, a signal comprising two tokens may be referred to as a two token multi-value signal. In one example, a two token multi-value signal may be referred to as having a least significant token and a most significant token. In another example, the least significant token may be referred to as token zero while the tokens ascending in significance may be referred to as token one, token two and so forth. In the example of quad logic, a token may have a logical value of 0, 1, 2, or 3. A two token multi-value signal may have logical values of 00, 01, 02, 03, 10, 11, 12, and so forth. Row token 18 is transmitted to row driver 20. Row driver 20 interprets row token 18 and outputs a set of signals indicating the logical value of row token 18. For example, in quad logic, row token 18 has one of four possible values. Row driver 20 has four output lines. Each output line represents one of the four possible logic values of row token 18. The output line corresponding to the logic value of row token 18 will be driven to a voltage sufficient to drive a row of switching matrix 14. In one example, the output line corresponding to the logic value of row token 18 is driven to VCC or 3.3 volts. In one example, no more than one output line of row driver 20 will be on at any time. Row driver 20 will be discussed in more detail below.

System 10 also has column token 22 and column driver 24. Similar to row token 18, column token 22 is a signal holding on of two or more possible values. In the example of quad logic column token 22 may have the value 0, 1, 2, or 3. Column driver 24 interprets column token 22 and activates one of its output lines corresponding to the logical value of column token 22. In the example of quad logic, column driver 24 has four outputs. One output corresponds to a logical zero of column token 22, another output corresponds to a logical one of column token 22, another output corresponds to a logical two of column token 22, and another output corresponds to a logical three of column token 22. In one example, the output line of column driver 24 corresponding to the logical value of column token 22 is driven to a voltage sufficient to drive a set of transistors. In one example, this voltage is VCC or 3.3 volts. The output lines of column driver 24 correspond to columns in switching matrix 14.

System 10 also has column select 26. Column select 26 is connected to the columns of SM 14 and the outputs of column driver 24. Column select 26 connects I/O port 28 to the column of SM 14 corresponding to the logical value of column token 22 as determined by column driver 24. Column select 26 will be discussed in greater detail below. An example will be given to illustrate the functionality of system 10. This example will use quad logic. Row token 18 has the logic value 2. Row driver 20 interprets row token 18 and drives the row of SM 14 corresponding to the logic value 2. Column token 22 has the logic value 3. Column driver activates the output line corresponding to the logic value 3. Column select 26 connects I/O port 28 to the column of SM 14 corresponding to a logic value 3. The intersection of row 2 and column 3 of SM 14 is activated and the pass through port 16 connected to that intersection is connected to I/O port 26. A token transmitted to I/O port 26 would now be transmitted to the pass through port 16 corresponding to the intersection of row 2 and column 3 of SM 14. In another example, a token transmitted to the pass through port corresponding to row 2 and column 3 of SM 14 would now be transmitted to I/O port 26. Advantageously the present system allows for flexible data steering. In the example of quad logic, one of sixteen paths can be chosen with only two control tokens. Similarly, sixteen data paths can be muxed into one path with two control tokens. Other advantages of the present system relating to the row and column drivers will be discussed below.

Figure 2:
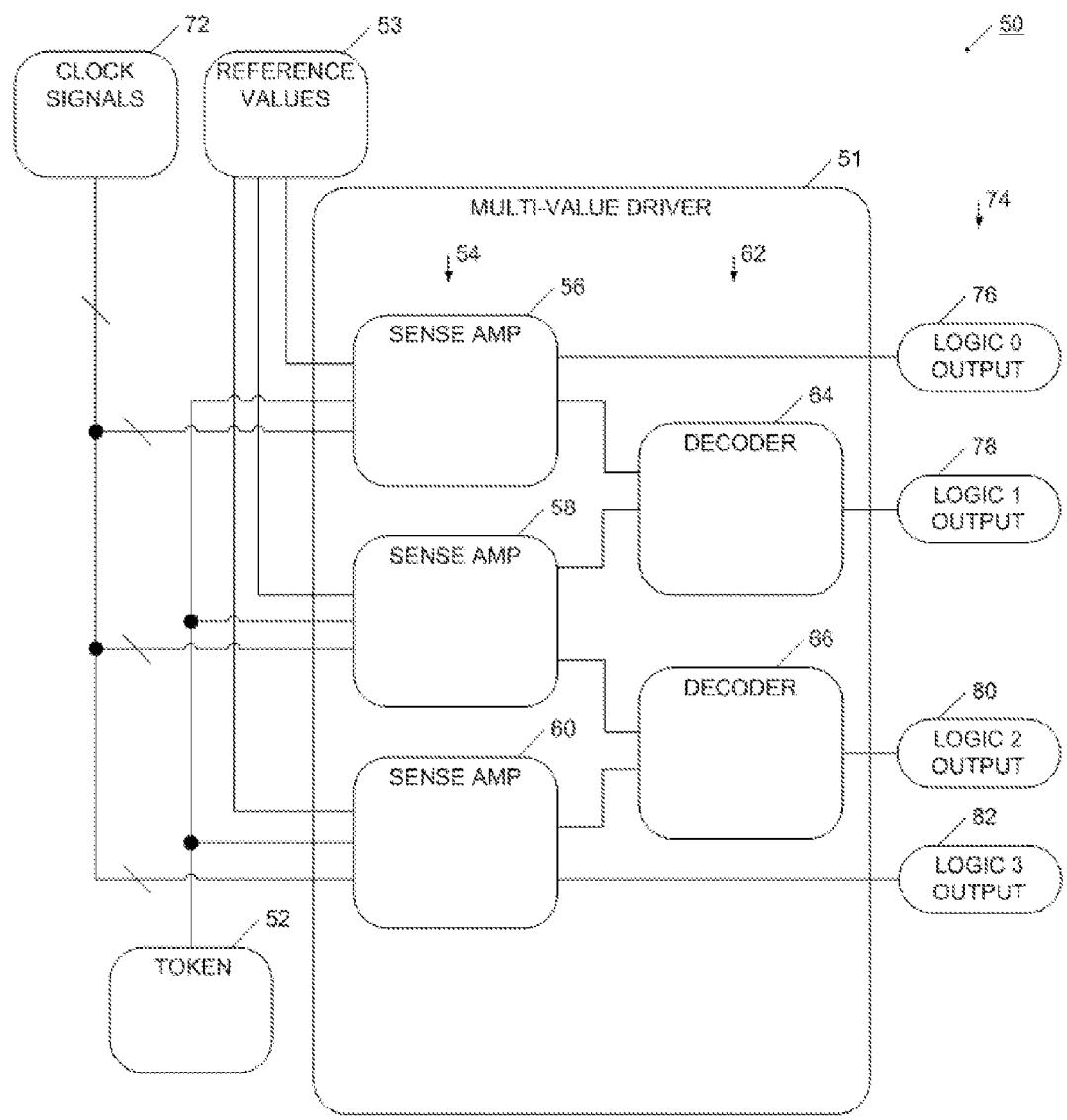
FIG. 2 is a block diagram of a system for interpreting a multi-value signal in accordance with the present invention.

Referring now to FIG. 2, system 50 is illustrated. System 50 has MVD 51, token 52, and reference values 53. MVD 51 is generally used to deduce the logical value of token 52. In one example, MVD 51 deduces the logical value of token 52 by comparing it to a set of reference values 53. MVD 51 has a set of output lines 74. The set of output lines 74 comprises one output line for each of the possible logic values of token 52. It will be appreciated that while the example shown in FIG. 2 illustrates MVD 51 for quad logic, MVD's may be constructed for operation in different bases including octal, decimal, base 32, and base 64. MVD 51 has a set of sense amps 54. In the example of quad logic, set 54 comprises sense amp 56, sense amp 58, and sense amp 60. Each sense amp in set 54 has as inputs a reference value 53, token 52, and clock signals 72. MVD 51 also has a set of decoders 62. In the example of quad logic, set 62 comprises decoder 64 and decoder 66. The decoders combine the outputs of elements of set of sense amps 54 to determine the logic value of token 52. Sense amp 56 compares a reference value 53 to token 52. It will be appreciated that a reference value is a voltage. In the example of quad logic in a circuit operating between 0 and 3.3 volts, the reference values may be defined as 0.8 volts, 1.6 volts, and 2.4 volts. In this example, any token whose actual voltage is below 0.8 volts is interpreted as a logical zero. Any token whose voltage is between 0.8 volts and 1.6 volts is interpreted as a logical one. Any token whose voltage is between 1.6 volts and 2.4 volts is interpreted as a logical two. Any token whose voltage is greater than 2.4 volts is interpreted as a logical three. Each sense amp in set 54 has one or more outputs indicating whether the token 52 had a voltage higher or lower than the reference value supplied to the sense amp. In one example, sense amp 56 is given the reference value 0.8 volts. If token 52 has a voltage lower than 0.8 volts, sense amp 56 will output that the reference value 53 was higher. Effectively, this will activate logic zero output 76. If token 52 has a voltage higher than 0.8 volts, sense amp 56 will output that the input token 52 was higher. Effectively, this will deactivate the logic zero output 76. In the same example, sense amp 58 receives a reference value of 1.6 volts. Sense amp 58 will compare token 52 to the reference value. If token 52 has a voltage of 1.2 volts, sense amp 58 will output that the reference value was higher. Decoder 64 will then use the output from sense amp 56, that the input token value was higher, and the output from sense amp 58, that the reference value was higher, to determine that the token is between 0.8 volts and 1.6 volts and corresponds to a logic value of 1. Decoder 64 will then activate logic 1 output. Advantageously, the present system allows for a flexible, efficient way to determine the logical value of a signal with one of two or more possible values. The present system can be easily scaled to work in any base by adding additional sense amps and decoders. Further advantages corresponding to the use of sense amps will be discussed in detail below.

Figure 3:
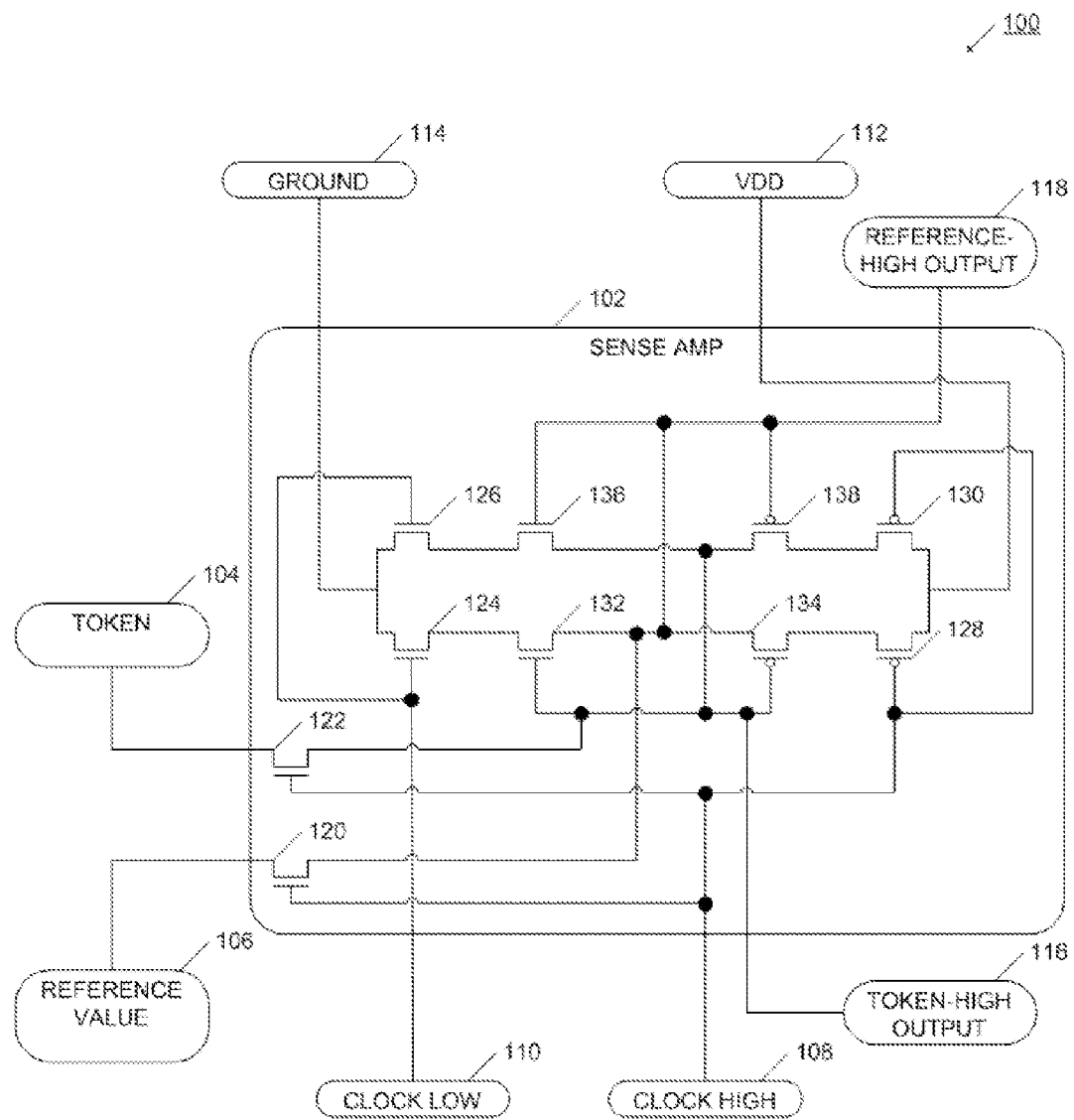
FIG. 3 is a block diagram of a sense amp in accordance with the present invention.

Referring now to FIG. 3, system 100 is illustrated. Generally, system 100 is used to compare two voltages and determine which of the two is greater. System 100 has sense amp 102. Sense amp 102 takes as inputs token 104, reference value 106, clock high 108, clock low 110, VDD 112, and ground 114. Clock high signal 108 is high when the clock is high and low when the clock is low. Clock low signal 110 is high when the clock is low and low when the clock is high. Sense amp 102 has a reference-high output 118 and a token-high output 116. Reference-high output 118 is high when the reference value input 106 is greater than the token input 104 and low when the reference value input 106 is less than the token input 104. Token-high output 118 is high when the reference value input 106 is less than the token input 104 and low when the reference value input 106 is greater than the token input 104. In another example, sense amp 102 may have only output, either reference-high output 118 or token-high output 116.

Sense amp 102 has n-type transistors 120 and 122. The gates of transistors 120 and 122 are tied to clock high 108. When the clock is high, the voltages of token 104 and reference value 106 are driven through gates 120 and 122 respectively. While the clock is high, the voltage of token 104 is driven to the gates of transistors 132 and 134. Similarly, the voltage of reference value 106 is driven to the gates of transistors 136 and 138 while the clock is high. Sense amp 102 has n-type transistor pair 124 and 126. The gates of both transistors are tied to clock low 110. The drains are also tied together and connected to ground 114. Sense amp 102 also has p-type transistor pair 128 and 130. The gates of both transistors are tied to clock high 108. The drains are also tied together and connected to VDD. After the token input 104 and the reference value input 106 have been driven into the circuit while the clock is high, the clock goes low. Transistors 120 and 122 are closed off, the gates of transistors 124, 126, 128, and 130 are opened and the circuit is allowed to float. After a settling time, the reference-high output and the token-high output are driven to opposites ends of the circuit's voltage range. For example, if the circuit operates between 0 and 3.3 volts and the token input 104 is higher in voltage than the reference value input 106. The token-high output will be driven to 3.3 volts and the reference-high output will be driven to 0 volts. It will be appreciated that only one of many possible functionally similar implementations of a sense amp has been described in relation to the present system.

Advantageously, because system 100 operates according to clock signal 108 and 110, it uses less power than other systems for comparing voltages. For instance, some systems for comparing voltages make use of long-tail pairs. Long tail pairs are known in the art and will not be described in detail. However, long tail pairs constantly use power regardless of operation state. Sense amp 102 of system 100 only uses significant power on the transition of clock signal 108 and clock signal 110. The reduced power consumption of the sense amp represents a significant advantage over long-tail pairs. Furthermore, unlike long-tail pairs and other voltage comparators, the present system can be used as a register. Once the clock goes low and the outputs settle, the outputs will remain constant until the system is clocked again or the system loses power. This register functionality provides great latitude and flexibility in designing more sophisticated circuitry without complicating the underlying components. The inherent register functionality also eliminates problems caused by wandering outputs common to other voltage comparators.

Figure 4:
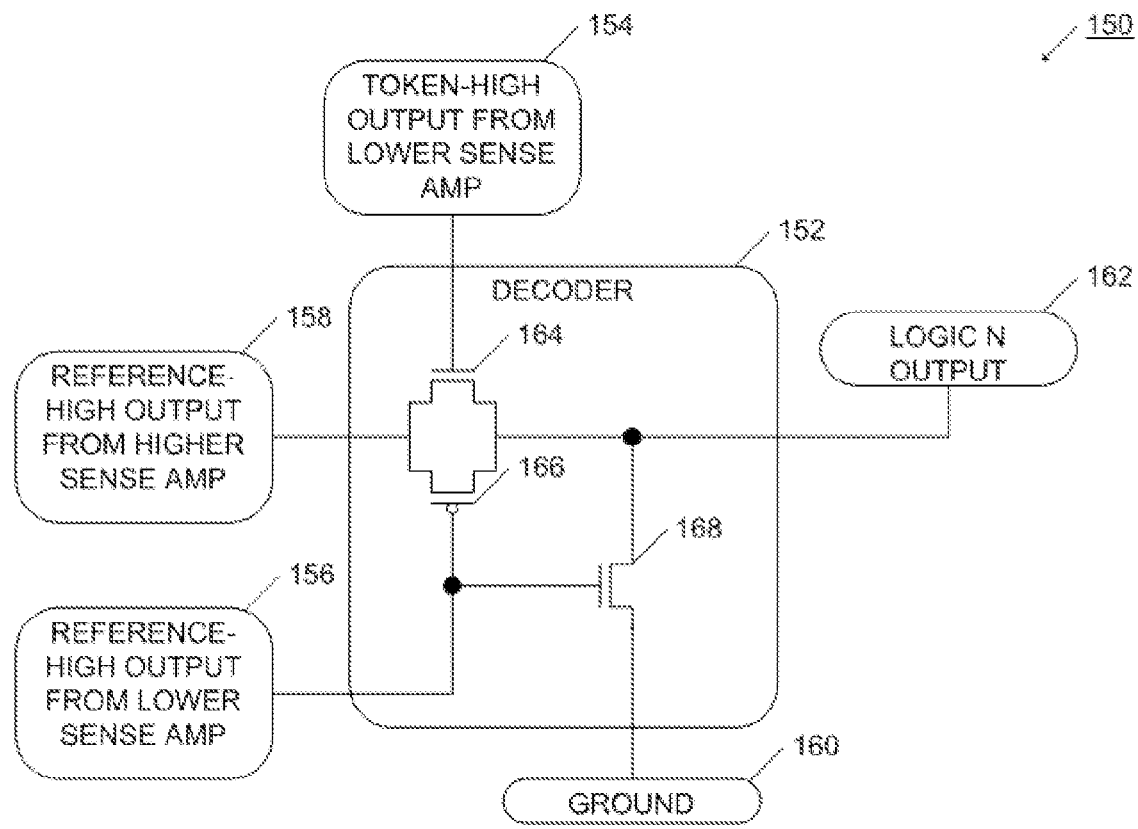
FIG. 4 is a block diagram of a decoder in accordance with the present invention.

Referring now to FIG. 4, system 150 is illustrated. Generally, system 150 is used to combine the information from two sense amps to determine if the voltage of a token lies between the voltages of the reference values supplied to the sense amps. It will be appreciated that the circuitry of decoder 152 represents one implementation of a decoding function and that other, functionally equivalent, embodiments are possible. Decoder 152 receives as inputs, the outputs of sense amps. Specifically, decoder 152 makes use of the token-high output from a first sense amp 154, the reference-high output from the same, first sense amp 156, and the reference-high input from a different, second sense amp 158. The referenced first sense amp, corresponds to a lower reference value. The second referenced sense amp corresponds to a higher reference value. For example, the first sense amp may have compared the token to a reference value of 0.8 volts (lower) while the second sense amp may have compared the token to a reference value of 1.6 volts (higher). In effect, if the token was higher than the lower reference value (token-high output from lower sense amp is high) and the token is lower than the higher reference value (reference-high output from lower sense amp is high), the logic N output 162 will be high. N-type transistors 164 and 168 and p-type transistor 166 represent one way to achieve this functionality. The gate of transistor 164 is tied to the token-high output from a lower sense amp 154. The gates of transistors 166 and 168 are tied to the reference-high output from a lower sense amp 156. The sinks (or drains) of transistors 164 and 166 are tied together and connected to the reference high output from a higher sense amp 158. the drains of all three transistors (164, 166, 168) are tied together and connected to logic N output 162). The sink of transistor 168 is connected to ground 160.

Figure 5:
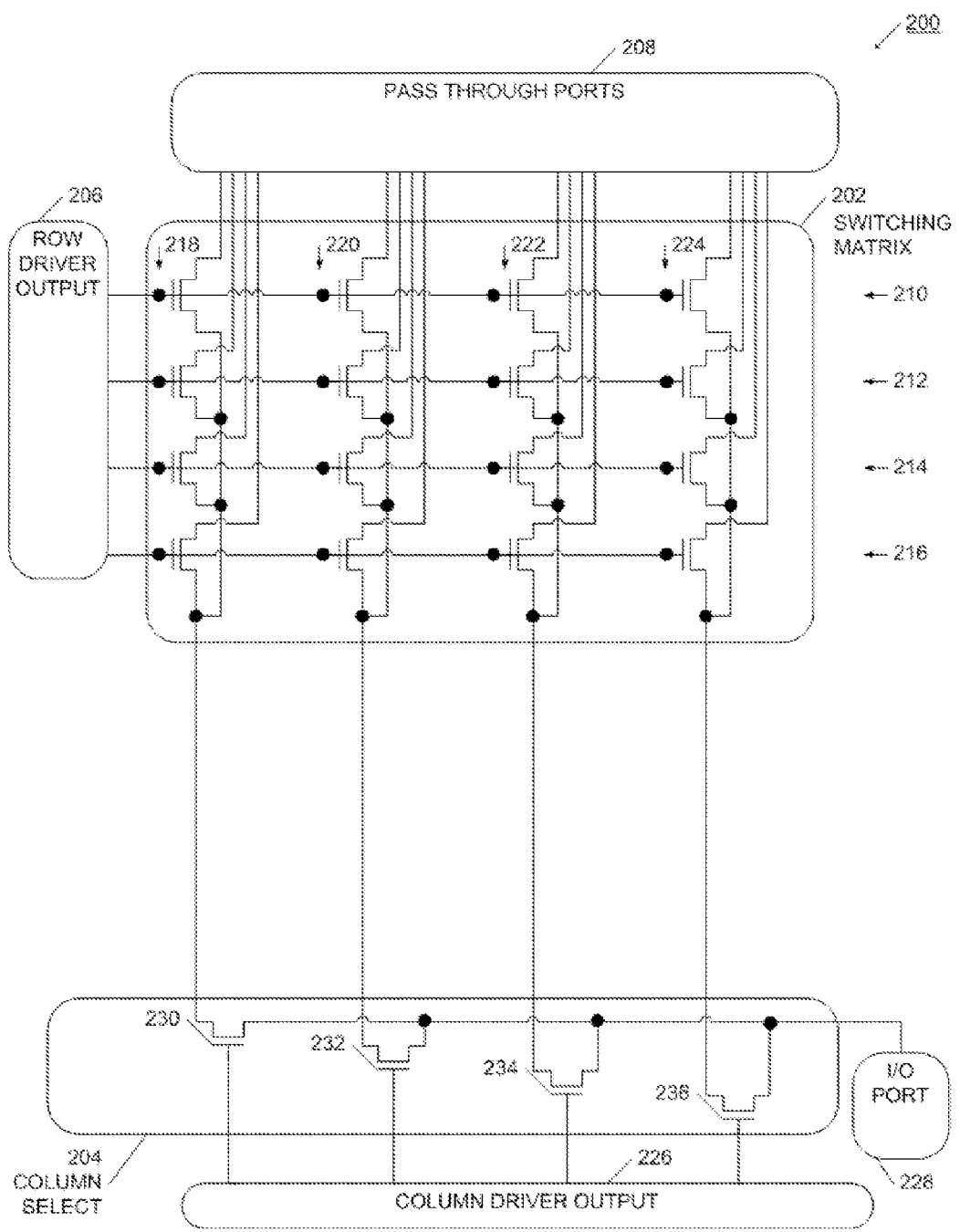
FIG. 5 is a block diagram of portions of a multi-valued flow controller in accordance with the present invention.

Referring now to FIG. 5, system 200 is illustrated. FIG. 5 describes exemplary internal configurations of a switching matrix 202 and column select 204. Generally, system 200 facilitates the steering of multi-valued signals. It will be appreciated that elements of system 200 are similar to their corresponding elements in FIG. 1. System 200 has switching matrix (SM) 202. SM 202 comprises the connections between the row driver outputs 206, column select 204, and pass through ports 208. In an example of quad logic, SM 202 comprises four rows (210, 212, 214, and 216) and four columns (218, 220, 222, 224). In one example, the intersection of each row and column occurs at an n-type transistor. It will be appreciated that p-type transistors, transmission gates, and other circuits could be used as well. All of the gates in a row of SM 202 are tied to a single row driver output line 206. In one example, all the gates of the four transistors in row 210 are tied to the logical zero row driver output line 206. The drains of each column of transistors are all tied together. For example, all the transistors in column 218 have their drains connected. The sink of each transistor in SM 202 is connected to a pass though port 208.

The column select circuitry 204 comprises the connections between the column driver outputs 226, I/O port 228, and the columns of switching matrix 202. In one example, column select 204 has a transistor for each column in SM 202. The sink of the transistor corresponding to each column of SM 202 is tied to that column. In one example, transistor 230 corresponds to column 218 of SM 202, transistor 232 corresponds to column 220, transistor 234 corresponds to column 222, and transistor 236 corresponds to column 224. The gates of the transistors in the column select 204 are tied to the outputs of the column driver 226. The drains of all four transistors (230, 232, 234, 236) are all tied to I\O port 228. An example will be used to demonstrate the functionality of system 200. In this example, sixteen tokens are connected to the pass through ports 208. System 200 will operate to select one of those tokens and transmit it to I/O port 228. A row driver has already received and interpreted a row token and has generated row driver outputs 206. For this example, the row token had a logical value of 0 so row 210, corresponding to logic value 0 is driven to VCC. Similarly, a column driver has already received a column token, interpreted it, and generated column driver outputs 226. For this example, the column token had a logic value of 2 so the gate of transistor 234, corresponding to column 222, corresponding to a logic value of 2 is activated. Activating the gate of transistor 234 in the column select connects the drains of the transistors in column 222 to I/O port 228. Now, because the transistors in row 210 have their gates open and the drains of transistors in column 222 are connected to I/O port 228, the token at the pass through port 208 connected to the sink of the transistor at the intersection of row 210 and column 222 will pass through to the I/O port. It will be appreciated that p-type transistors, transmission gates, and other circuits can be used in the column select 204 and at the intersection of SM 202 rows and columns.

Figure 6:
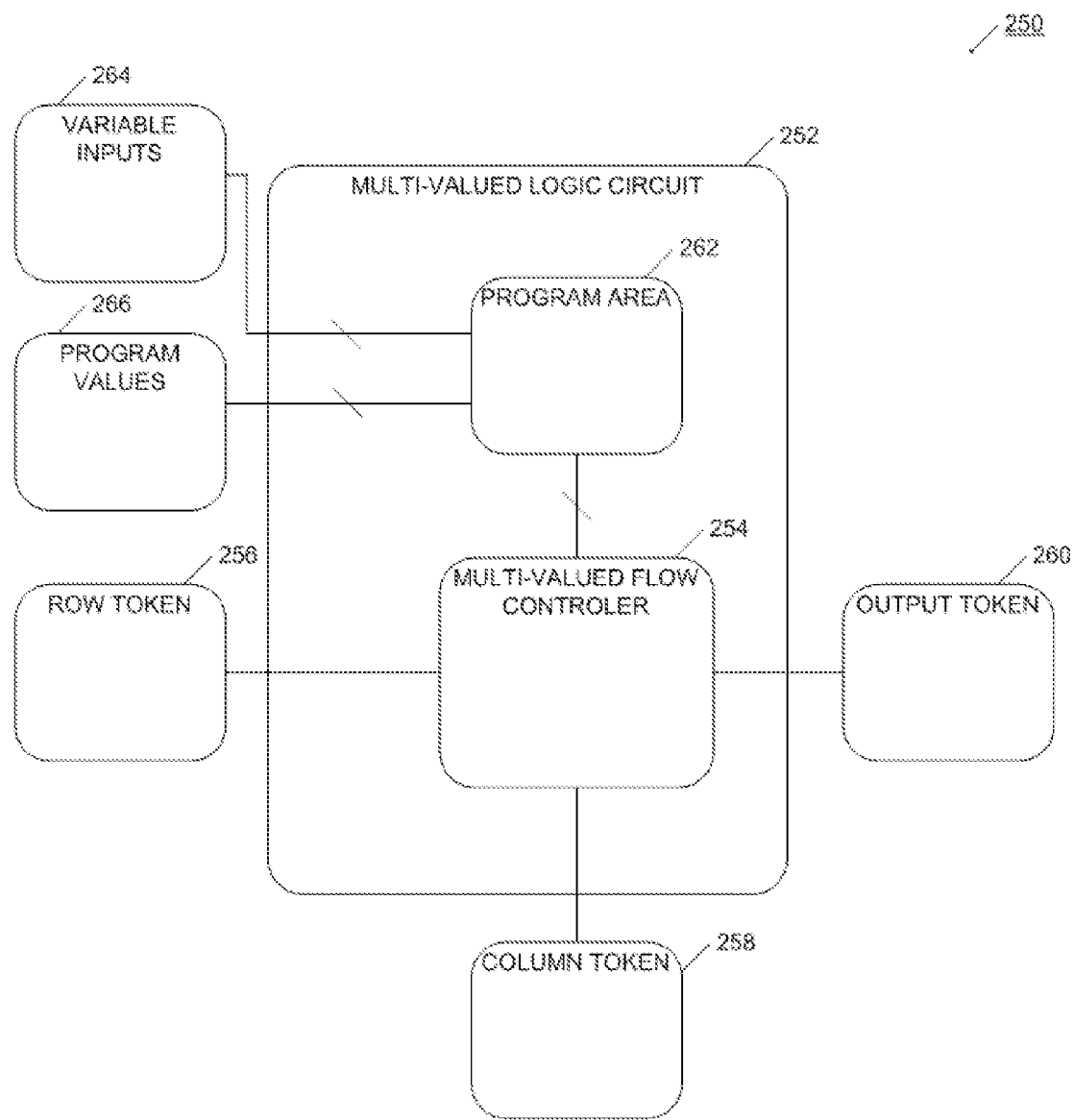
FIG. 6 is a block diagram of a multi-value logic circuit in accordance with the present invention.

Referring now to FIG. 6, system 250 is illustrated. Some elements of system 250 are similar to corresponding elements from system 10 of FIG. 1 and will not be described at length. However, while the multi-value flow controller of system 10 performed steering functions, generally, system 250 of FIG. 6 can be programmed to perform arbitrary logic functions. System 250 has multi-value logic circuit (MVLC) 252. MVLC 252 comprises program area 262 and multi-value flow controller 254. It will be appreciated that MVFC 254 is similar to the MVFC 12 from FIG. 1. Program area 262 comprises connections between program values 266, variable inputs 264, and the pass through ports of MVFC 254. Program values 266 are fixed voltages representing logic levels. For example, in quad logic on a circuit operating between 0 and 3.3 volts, the program values may comprise 0.4, 1.2, 2.0, and 2.8 volts. The program value 0.4 volts may correspond to a logic value of 0. The program value 1.2 volts may correspond to a logic value of 1. The program value 2.0 volts may correspond to a logic value of 2. The program value 2.8 volts may correspond to a logic value of 3. It will be appreciated that the program values may be changed to suit the needs of a particular application. In one example, the program values 266 are placed half way between the voltages associated with the reference values used in the sense amps of MVFC 254. Variable inputs 264 are lines for carrying tokens to the program area 262.

Program area 262 is configured to connect a combination of program values 266 and variable inputs 264 to the pass through ports of MVFC 254. When MVFC 254 receives row token 256 and column token 258, one of the pass through ports is selected and the value on the pass through port is transmitted through the I/O port of MVFC 254 and becomes output token 260. The program area 262 determines the value on each pass through port while the MVFC 254 determines which pass through port is connected to the output. Advantageously, the present system provides a means for computing arbitrary multi-value logic functions. Additionally, because the multi-value drivers in the MVFC are clocked, the result of a logic function can be held by the MVLC indefinitely. The MVLC can both calculate and store results reducing the need for accumulators or other registers to hold the results of calculations.

Figure 7:
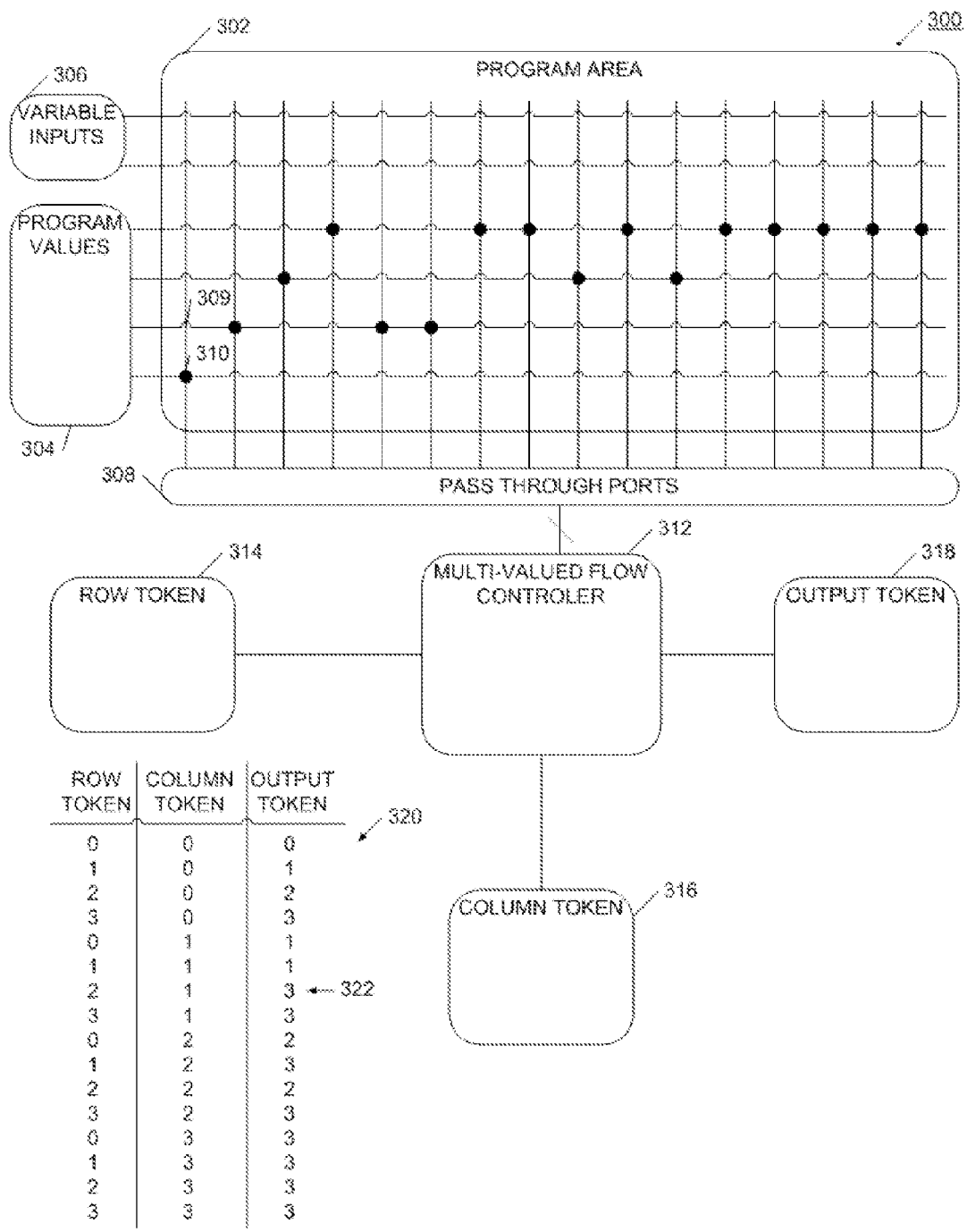
FIG. 7 is another block diagram of a multi-value logic circuit in accordance with the present invention.

Referring now to FIG. 7, system 300 is illustrated. FIG. 7 describes an exemplary internal configuration of program area 302. Generally, program area 302 comprises connections between program values 304, variable inputs 306, and pass through ports 308. In one example, the variable inputs 306 and program values 304 from rows in the program area 302. The pass through ports 308 form columns in the program area 302. The intersection of each row and column is either connected (as in intersection 310) or left open (as in intersection 309). In one example, the connection between rows and columns in the program area 302 are made by fusing the row and column at the intersection. In another example, transistors could be used to form the connections. Connections between a row and column in the program area 302 determine the values on the pass through ports 308. For example, if intersection 310 represents a connection between a program value 304 of logic 0, the pass through port 308 connected at intersection 310 will carry the logic value 0. In the same example, MVFC 312 may connect the pass through port connected at intersection 310 to the I/O port of MVFC 312 responsive to the logic values of row token 314 and column token 316. Output token represents the value at the I\O port of MVFC 312. In this example, output token 318 would have the logic value 0.

Truth table 320 represents an example of a multi-value logic function. Specifically, truth table 320 represents the quad logic version of a binary 'or' operation. In order for system 300 to perform the logic function described by truth table 320, connections are made in program area 302. Further, the row token 314 and column token 316 are used as operands. The result is the output token 318. MVFC 312 connects a pass through port to the I/O port of MVFC 312 responsive to the value of the row token 314 and the column token 316. Connections are made between the program values 304 and the pass through ports 308 in the program area 302 such that when row token 314 and column token 316 have logic values corresponding to a row of table 320, output token 320 has the value indicated by the same row in table 320. For example, if row token 314 has the logic value 2 and column token 316 has the logic value 1, output token 318 has the value 3 as shown in row 322 in table 320. Advantageously, the present system allows for the calculation of arbitrary logic functions. In addition, the present system can act as a hybrid device for computing logic functions and steering the flow of information. For example, a portion of the pass through ports 308 can be connected to program values 304 for computing logic functions while the remainder can be connected to variable inputs 306 to act as pass through lines for other signals.

Figure 8:
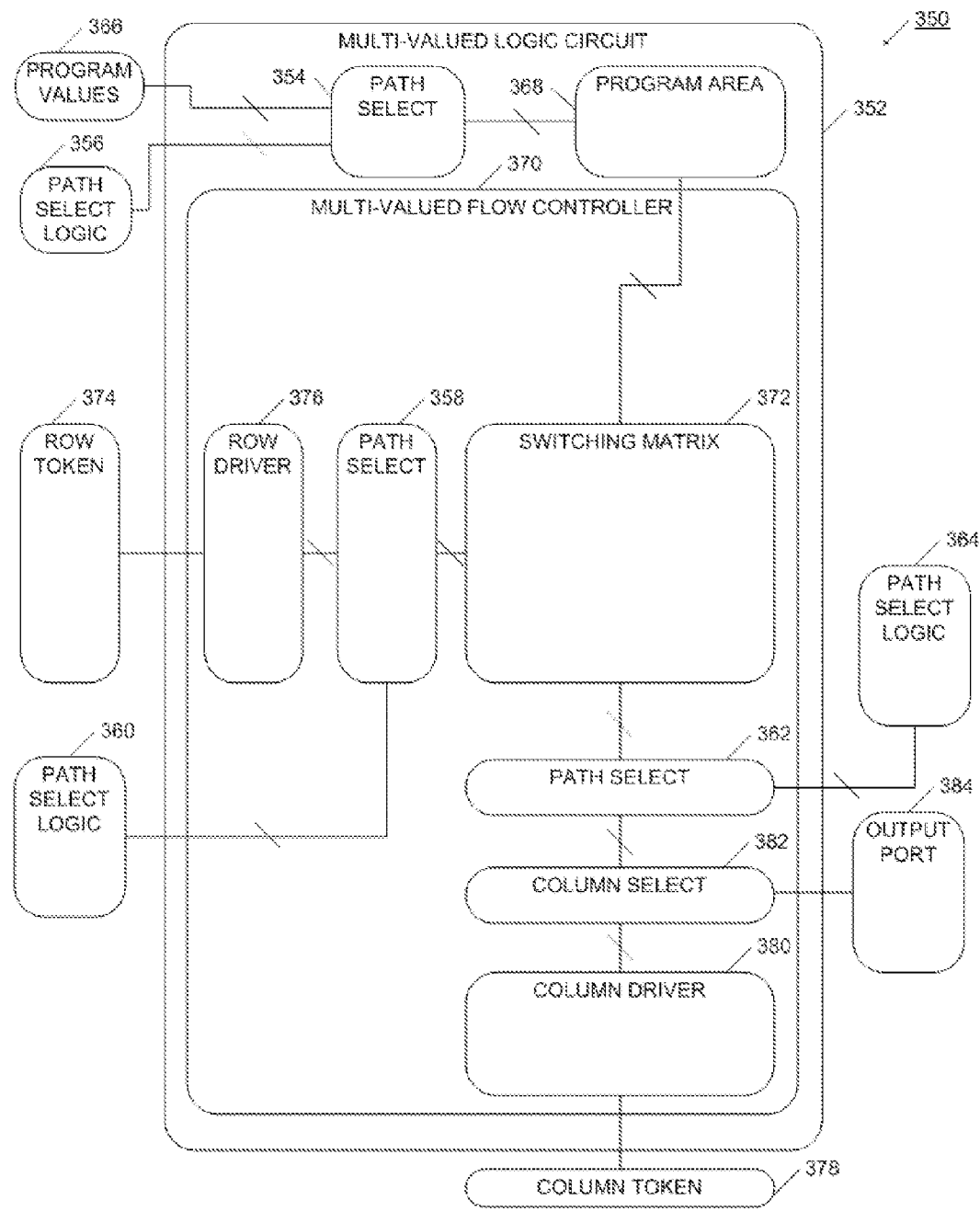
FIG. 8 is a block diagram of a multi-value logic circuit with path selectors in accordance with the present invention.

Referring now to FIG. 8, system 350 is shown. It will be appreciated that elements of system 350 are similar to corresponding elements of system 250 in FIG. 6 and system 10 of FIG. 1. System 350 has MVLC 352. MVLC 352 comprises MVFC 370, program area 368, and program path select circuit 354. Path select circuit 354 takes as inputs the program values 366 and control signals from the path select logic 356. Path select 354 arranges the inputs to the program area 368 responsive to the control signals from the path select logic 356. For example, if the program values 366 enter the path select circuit 354 arranged in the order 0, 1, 2, and 3, the path select, responsive to signals from the path select logic, may reorder the values to the order 2, 0, 3, and 1. In another example, the path select might drop several of the program values 356 and connect all the lines entering into the program area 368 from the path select 354 to the logic value 2. Advantageously, the path select 354 allows MVLC 352 to implement two or more logic functions with only one programming area 368. For example, if MVLC 352 were designed to implement the 'or' function described in table 320 of FIG. 7, the path select circuit 354 could be used enable MVLC 352 to alternatively calculate the 'or' and the 'nor' functions. By swapping the line connected to logic 0 with the line connected to logic 3 and swapping the line connected to logic 1 with the line connected to logic 2, the path select effectively applies a 'not' to the 'or' function, resulting in a 'nor' function.

Similarly, a path select circuit can be placed between row driver 376 and switching matrix 372 in MVFC 370. Responsive to path select logic 360, path select 358 can manipulate the outputs of the row driver, possibly changing the active row of switching matrix 372. In one example, path select 358 can be used to convert an addition operation into a subtraction operation. Similarly, a path select circuit can be inserted in between column select 382 and switching matrix 372. In one example, responsive to path select logic 364, path select 362 can be used to account for the carry in of an addition operation. In another example, path select 362 can be placed between column driver 380 and column select 382. In another example, the functionality of path select logic 356, path select logic 360, and path select logic 360 are implemented as a singe circuit. Advantageously, the path select circuits increase the flexibility of the MFLC, allowing it to implement two or logic functions with a single program area. This represents a significant savings on the number of transistors and space required to implement the two or more logic functions with separate MVLC's.

Figure 9:
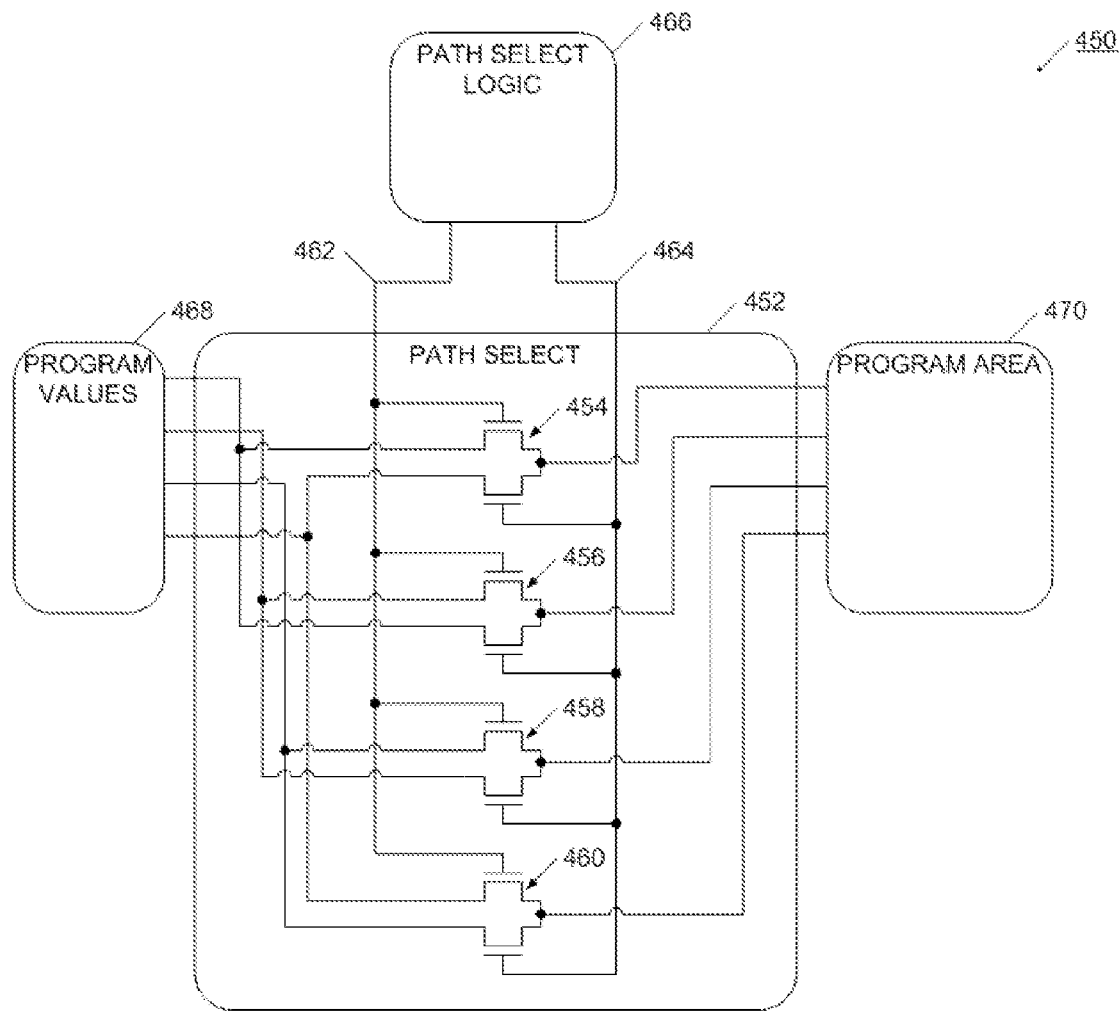
FIG. 9 is a block diagram of a path selector in accordance with the present invention.

Referring now to FIG. 9, system 450 is illustrated. FIG. 9 describes an exemplary internal configuration of a path select circuit 452. Path select 452 comprises transistor pairs 454, 456, 458, and 460. The gates of one of the transistors in each transistor pair is tied to a first control signal 462 from path select logic 466. The gate from the other transistor in each transistor pair is tied to a second control signal 464 from path select logic 466. Responsive to control signal 462 and control signal 464, the gate of one transistor in each transistor pair will be activated. The sinks of the transistors in each transistor pair are tied together form an output line of the path select circuit 452. In one example, the outputs of the path select circuit 452 form the rows of program area 470. The drains of each transistor in each transistor pair are connected to one of the inputs to the path select 452. In one example, the inputs to the path select 452 are the program values 468. In one example, the program values 468 transmitted to the path select circuit are ordered as logic 3, 2, 1, and 0. In one example, control signal 462 from path select logic 466 causes the output lines of path select 452 to carry the ordered logic value 3, 2, 1, and 0 effectively passing the program values 468 unchanged to the program area 470. Alternatively, the control signal 464 from path select logic 466 causes the output lines to carry the ordered logic values 0, 3, 2, and 1, effectively shifting the program values 468 by one position before they reach the program area 470.

Figure 10:
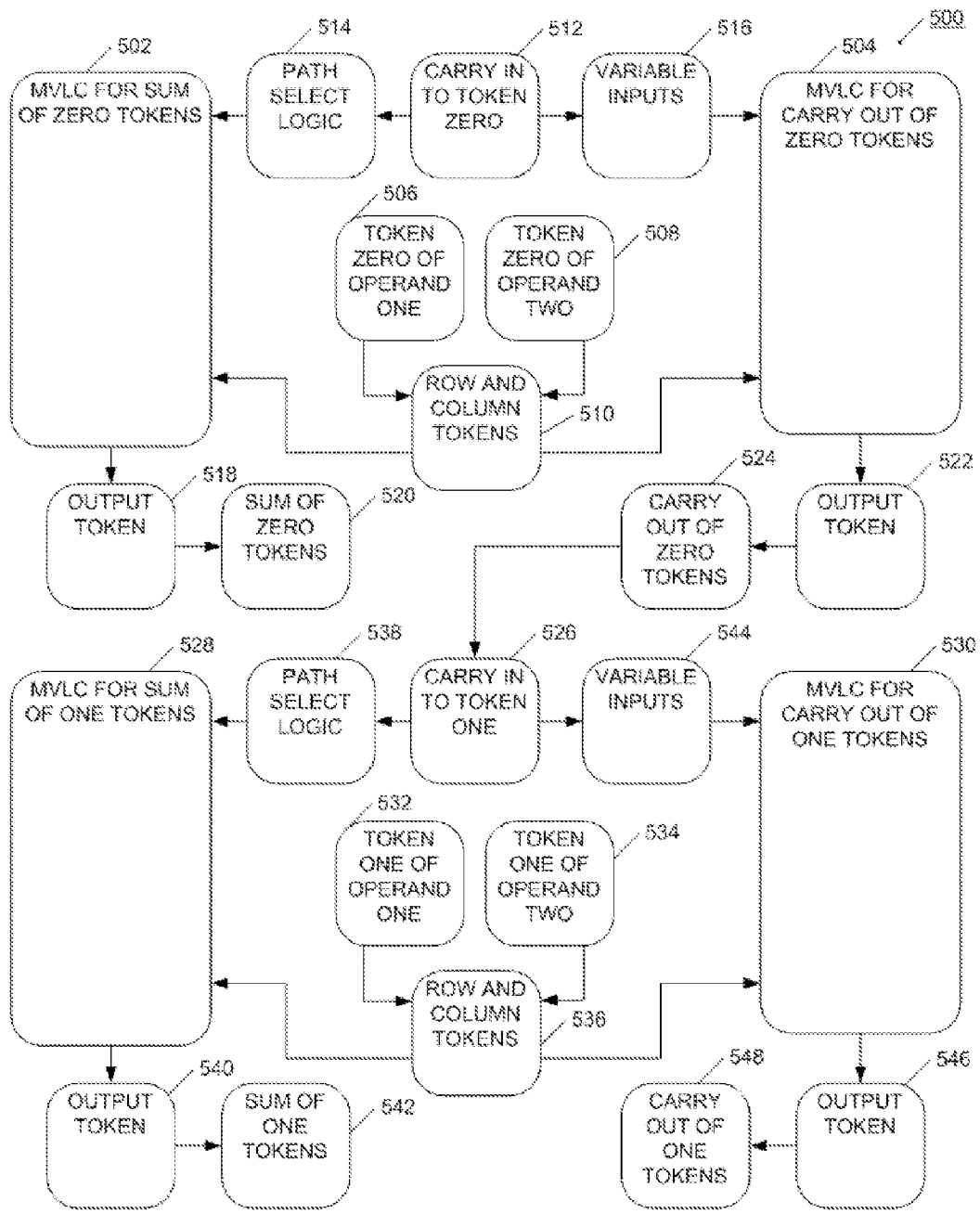
FIG. 10 is a block diagram of an adder in accordance with the present invention.

Referring now to FIG. 10, system 500 for adding multi-token signals is illustrated. MVFC and MVLC circuits can be combined to form more complex computational circuits. For example, MVLC's can be combined to implement an add function for multi-token signals. In one example, each operand in the addition comprises two quad tokens. This operation is equivalent to a four bit, binary addition. For purposes of this example, the two operands will be called operand one and two. The two tokens in each operand will be referred to as token zero and token one. Token zero will be understood to be the less significant token. The zero token of operand one and the zero token of operand two will be referred to collectively as the zero tokens. Two MVLC's are used for each token of the length of the operands. In this example, the operands are two tokens long so a total of four MVLC's will be used. MVLC 504 is used to calculate the carry out from the summation of the zero tokens of operands one and two. MVLC 502 is used to calculate the summation of the zero tokens of operand one and two. As illustrated, token zero of operand one 506 and token zero of operand two 508 become the row and column tokens 510 for both the MVLC for the sum of the zero tokens 502 and the MVLC for the carryout of the zero tokens 504. System 500 also enables the use of a carry in 512 to calculate the value of the sum's zero token. While tied to a logic zero value for two's compliment addition, other forms of addition, such as one's compliment, may use a non logic zero carry in to the zero token 512. The carry in to the zero token 512 is connected to the path select logic 514 to the MVLC for sum of zero tokens 502. In one example, the carry in to the zero token 512 is connected to the path select logic 514 affecting the path selector located between the switching matrix and column select in MVLC for sum of zero tokens 502. Path select logic 514 causes the path select circuitry to change the column of the switching matrix connected to the I/O port of MVLC for sum of zero tokens 502 responsive to the logical value of the carry in to the zero token 512. For example, if the carry in to token zero 512 has a logical value of one, indicating a carry in, the path select logic 514 causes the path select circuit in MVLC 502 to access a different column of the switching matrix corresponding to a logic value one higher than indicated by token zero of one of the operands. In one example, token zero of operand zero 506 has a logic value of 1 and becomes the column token of MVLC 502. If the carry in to token zero has a logic value of 1, indicating a carry in, the path select logic will cause MVLC 502 to access the column of the switching matrix in MVLC 502 corresponding to a logic value 2 rather than the logic value 1 of the column token. Effectively, the path select logic 514 increments the column token responsive to a carry in. The result of the addition is the output token 518 of MVLC 502 and represents the sum of the zero tokens 520. Advantageously, the present system allows for a very fast and compact way to account for a carry in.

MVLC 504 is used to calculate the carry out generated by the addition of the zero tokens 524. Token zero of operand one 506 and token zero of operand two 508 become the row and column tokens 510 for MVLC 504. MVLC 504 can also make use of carry in 512 to account for some addition techniques. The carry in 512 is passed in to the program area of MVLC 504 as a variable input 516. The pass through ports of MVLC 504 corresponding to a pair of row and column tokens 510 which sum to the maximum logic value are tied to the variable input in the program area of MVLC 504. For example, if the row column has a logic value 1, corresponding to a logic value 1 for token zero of operand two 508, and the column token has a logic value of 2, corresponding to a logic value 2 for token zero of operand one 506, the sum of the tokens is the logic value three and the carryout is equal to the carry in. Accordingly, the pass through port corresponding to a row token with value 1 and column token with value 2 is tied to the variable input line 516 in the program area that is connected to the carry in 512. If the carry in has a logic value 1, the row token plus the column token plus the carry out equals 1. If the carry in is 0, the row token plus the column token plus the carry in equals 0. The output token 522 of MVLC 504 is the carry out from the addition of the zero tokens 524.

The process for calculating the second token of the addition is similar to the process for calculating the first token. Token one of operand one 532 and token one of operand two 534 become the row and column tokens 536 for MVLC 528 for calculating the sum of the one tokens and MVLC 530 for calculating the carry out of the addition of the one tokens. The carry out from the zero tokens 524 becomes the carry in for the addition of token one 526. The carry in 526 is used in the path select logic 538 for MVLC 528 in the same way as the carry in 512 was used in path select logic 514 for MVLC 502. Similarly, the carry in 526 is used as a variable input 544 in the program area of MVLC 530 in the same way carry in 512 was used as a variable input 516 to MVLC 504. The output token 540 of MVLC 528 represents the sum of the one tokens 542. the output token 546 of MVLC 530 represents the carry out from the addition of the one tokens 548. It will be appreciated that MVLC pairs could be used to perform an addition of multi-token signals with an arbitrary number of tokens. Advantageously, the present system provides a very simple way to perform addition for multi-token signals. Additionally, the present system provides a significant savings on transistors and space over equivalent binary operations. Further, because of the nature of the sense amps used in the MVLC's, the adder can act as a register for the result of the operation. This register functionality eliminates the need for additional storage and simplifies the data steering that must be performed in larger circuits.

Figure 11:
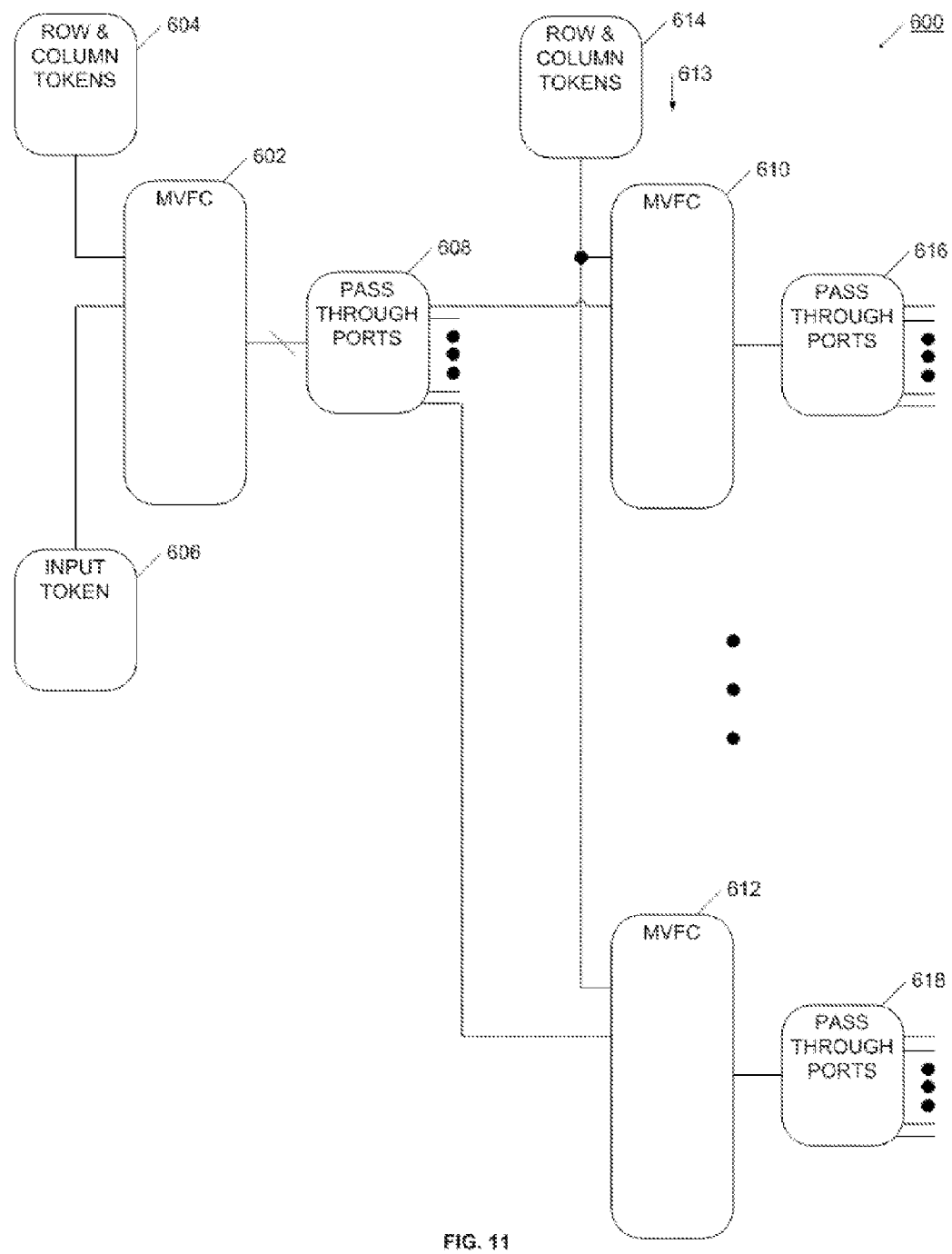
FIG. 11 is a block diagram of a steering array in accordance with the present invention.

Referring now to FIG. 11, system 600 for steering is illustrated. Generally, system 600 is used to drive a token on to one of many lines. System 600 comprises a set of multi-value flow controllers (MVFC's). MVFC 602 has row and column tokens 604 as inputs. MVFC receives input token 606 at its I\O port and drives input token 606 onto one of its pass through ports 608 responsive to the logical values of the row and column tokens 604. The pass through ports 608 re each connected to the I/O port of another MVFC. For example, one of the pas through ports 608 is connected to the I/O port of MVFC 610 and a different pass through port is connected to the I/O port of MVFC 612. MVFC 610, MVFC 612 and other MVFC's not illustrated form a second tier 613 of MVFC's. Each MVFC in the second tier 613 has one of the pass through ports of MVFC 602 connected to its I/O port. Additionally, all the MVFC's in the second tier 613 receive row and column tokens 614. Each MVFC in the second tier 613 drives the value at it's I/O port on to one of its pass through ports responsive to the logical values of row and column tokens 614. The operation of the system drives the input token 606 on to exactly one of the pass through ports of the MVFC's in the second tier 613. In the example of quad logic, the second tier comprises 16 MVFC's and the input token is driven on to exactly one of 256 lines output from the second tier 613. Advantageously, the present system allows a signal to be driven on to one of many possible lines quickly while using little space and power.

Figure 12:
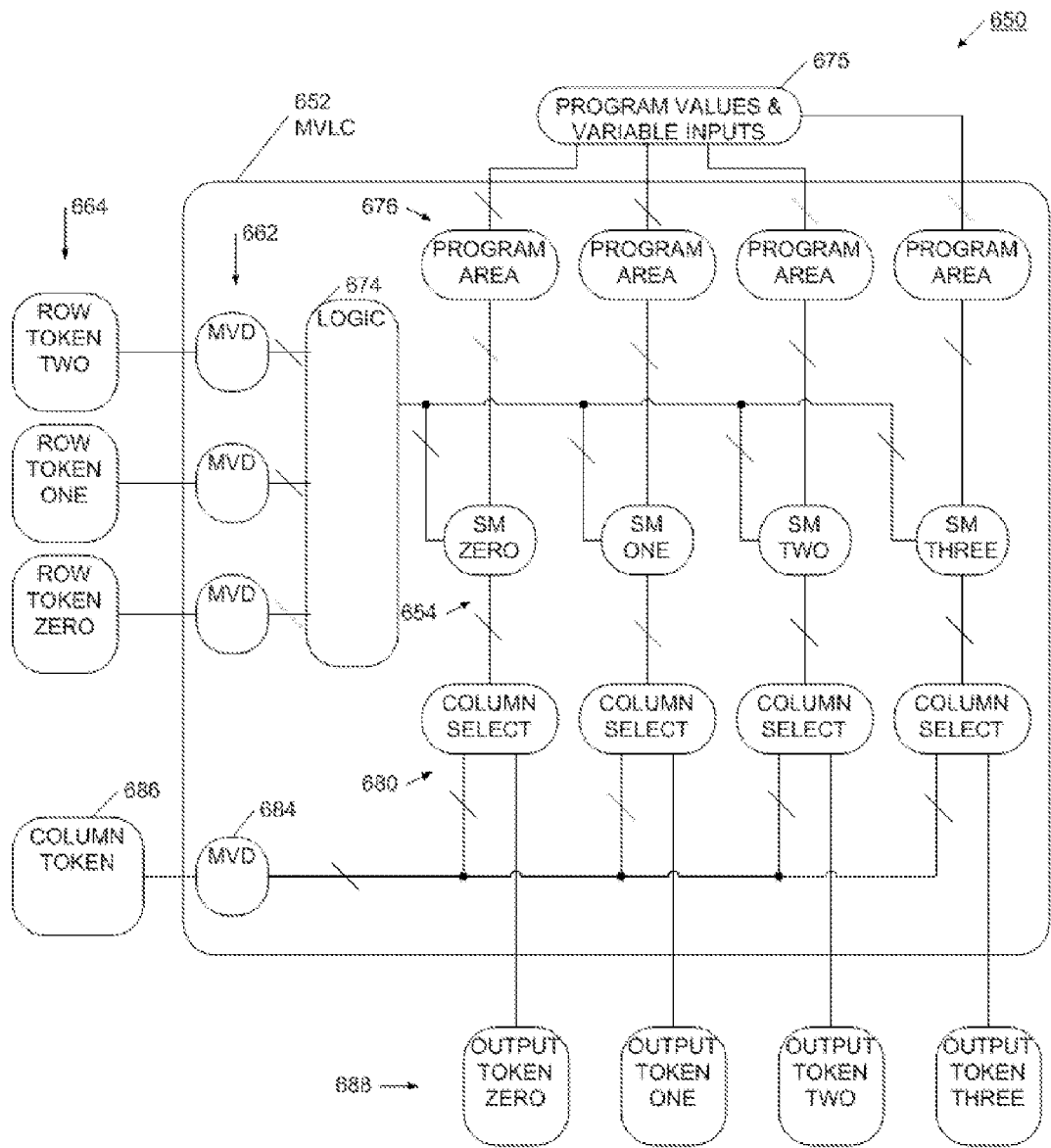
FIG. 12 is a block diagram of a multi-valued logic circuit in accordance with the present invention.

Referring now to FIG. 12, system 650 is illustrated. FIG. 12 describes an enhanced MVLC 652. In one example, system 650 can be used to simultaneously compute multiple logic functions. In another example, system 650 can be used as the basis for a controller in a microprocessor. MVLC 652 has a set of four switching matrices (SM's) 654. The rows of all four witching matrices 654 are formed by the outputs of logic block 674. Logic block 674 receives as inputs the output from 3 MVD's (multi value drivers) 662. In one example, logic block 674 logically 'ands' together every combination of one of the outputs from each of the three MVD's 662. In the example of quad logic, logic block 674 receives 12 inputs from MVD's 662 and computes the 64 possible 'and' operations where one operand comes from the output of each MVD. The outputs of logic block 674 comprise 64 lines, only one of which can be high.

The outputs of the logic block 674 form the rows of all four switching matrices 654. In applications where multiple operations must be performed on the same operands, using the same row lines to drive multiple switching matrices saves the space and transistors required to implement additional MVD's in a separate MVLC. Each of the switching matrices 654 is connected to a different program area 676. The set of program areas 676 allows the MVLC 652 to implement multiple functions with a single set of operands. For example, with a single set of operands, the program areas could respectively be programmed to enable the computation of the sum of the operands, the 'and' of the operands, the 'or' of the operands, and the exclusive 'or' of the operands. In one example, the program areas 676 comprise a common set of program values and variable inputs 675. In another example, the program areas 676 each comprise a different set of variable inputs. The columns of each of the switching matrices are connected to a one of a set of column select circuits 680. In one example the column select circuits are each connected to a single MVD 684. In another example, multiple MVD's could be used to drive each of the column select circuits. The output tokens 688 from the column selects form the outputs of the MVLC 652. Advantageously, the present system provides a flexible computing circuit that can compute multiple logic functions simultaneously. Additionally, the present system reduces the amount of transistors and space required to implement multiple logic functions from the same operands.

Figure 13:
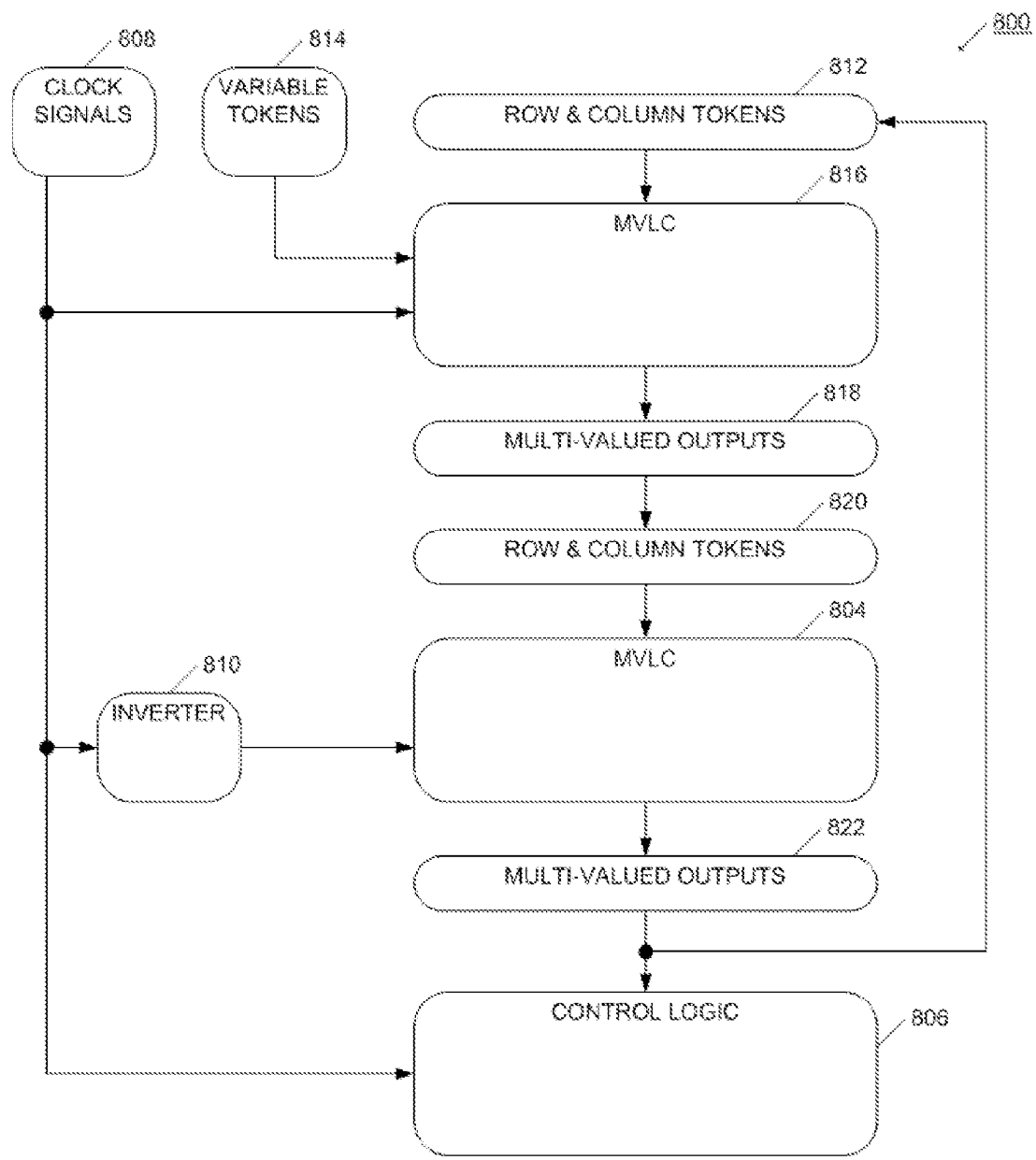
FIG. 13 is a block diagram of loading a controller in accordance with the present invention.

Referring now to FIG. 13, system 800 is illustrated. In addition to logic functions and routing functions, MVLC's can also serve as the basis for a controller in a finite state machine. System 800 has MVLC 816 and MVLC 804. MVLC receives row and column token 812 as inputs. Row and column tokens 812 represent the current state of the system 800. MVLC uses row and column tokens 812 and variable inputs 814 to generate one or more output tokens 818 during one phase of the clock signals 808. The output tokens 818 represent the next state of system 800. The output tokens 818 become the row and column tokens 820 for MVLC 804. MVLC 804 acts as a simple register for holding the state information generated by MVLC 816. The output tokens 822 of MVLC 804 are the same as the row and column tokens 820. The clock signals 808 pass through inverter 810 before reaching MVLC 804. As a result, MVLC loads during the opposite phase from MVLC 816. The inputs to MVLC 804 represent the next state as determined by MVLC 816. The output tokens 822 of MVLC 804 represent the current state of system 800. The current state information is used by control logic 806 to implement the functionality of the finite state machine. The current state information is also fed back and becomes the row and column tokens 812 of MVLC 816. On the next clock cycle, MVLC 816 determines the net state from the current state and the variable inputs 814. It will be appreciated that the variable inputs may be generated by the control logic or other sources.

Figure 14:
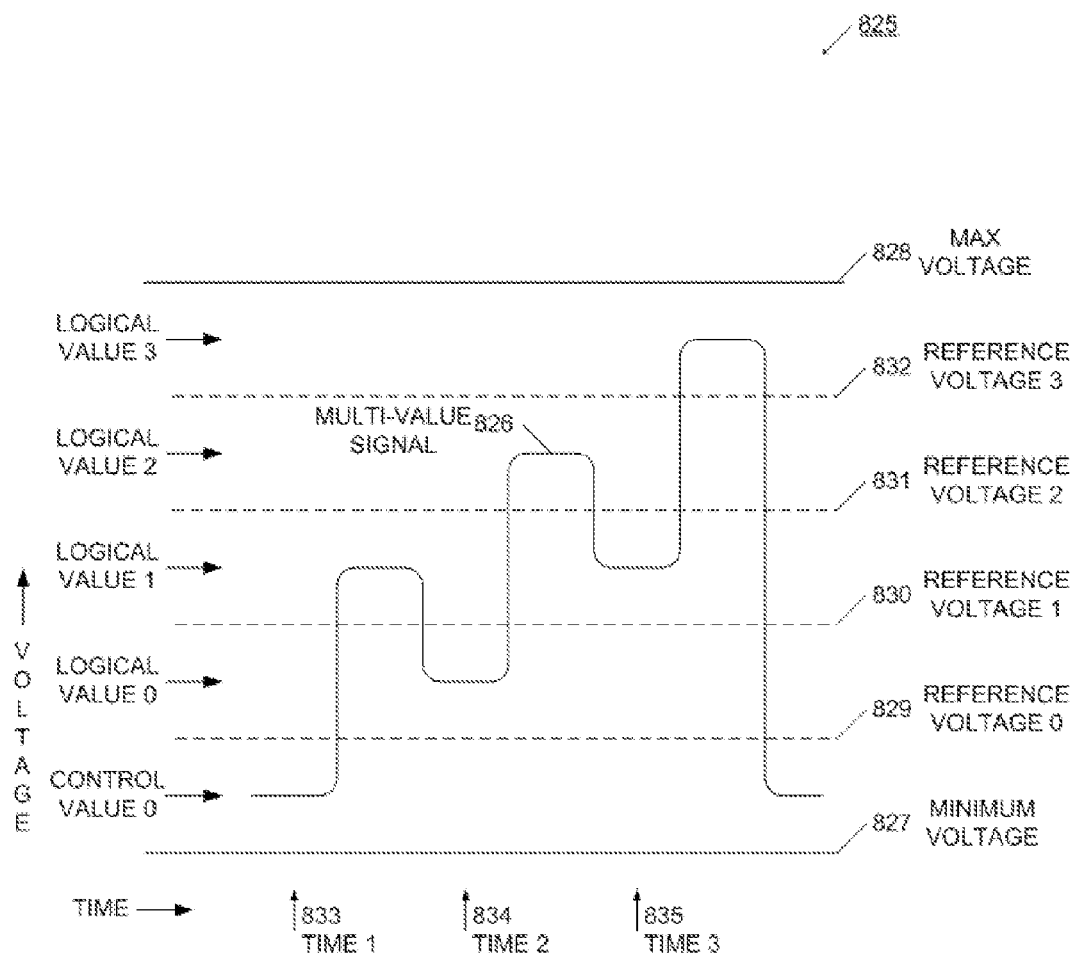
FIG. 14A is a graph describing the interpretation of signals having logical and control values.
FIG. 14B is a block diagram of a driver for interpreting signals with logical and control values.
Figure 14:
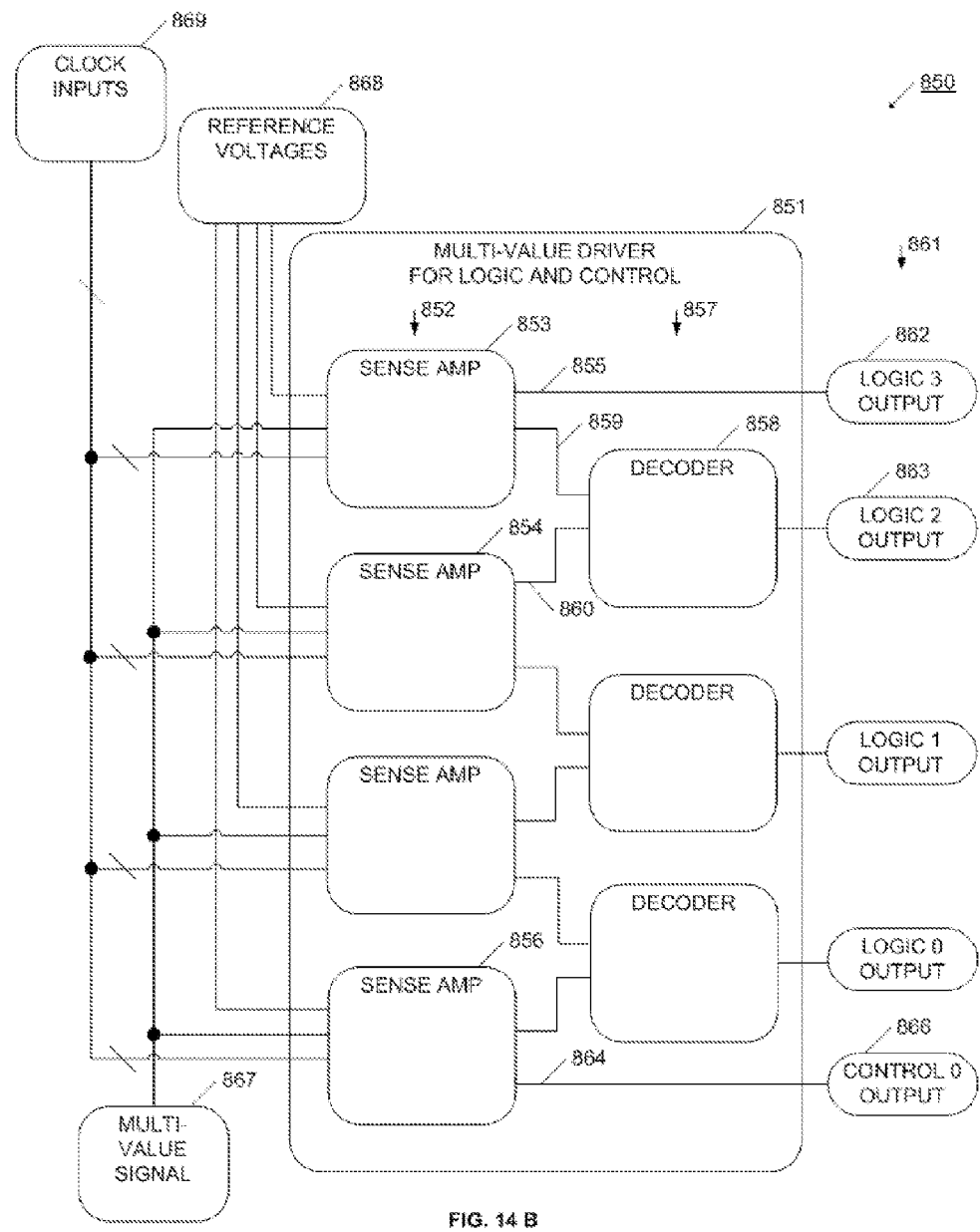

Referring now to FIG. 14-A, graph 825 illustrates a multi-value signal having a plurality of voltage ranges associated with logical values and a voltage range associated with a control value. Graph 825 depicts multi-value signal 826. The vertical axis of graph 825 represents voltage. The horizontal axis of graph 825 represents time. Multi-value signal 826 is illustrated in reference to a minimum voltage 827. In one example, minimum voltage 827 is zero volts and may be referred to as ground. In other examples, minimum voltage 827 may be a different voltage. Multi-value signal 826 is also depicted relative to a maximum voltage 828. In one example maximum voltage 828 may be 3.3 volts. In other examples, maximum voltage 828 may be different. Multi-value signal 826 is also depicted relative to a plurality of reference voltages. In this example, four reference voltages are illustrated.

Reference voltage zero 829 is the lowest reference voltage. In one example reference voltage zero 829 may be approximately 0.65 volts. Reference voltage one 830 is greater than reference voltage zero 829. In one example reference voltage one may be approximately 1.3 volts. In one example reference voltage two 831 may be approximately 1.95 volts. In one example, reference voltage three 832 may be 2.6 volts. It will be appreciated a range of voltages exist between minimum voltage 827 and referenced voltage zero 829. Similar voltage ranges exist between each adjacent reference voltage and between reference voltage three 832 and maximum voltage 828. Approximately equidistant spacing of reference voltages is not necessary and may be modified to accommodate design and implementation requirements. Similarly, more or less reference voltages may be used. It will be appreciated that a logic or control value is associated with each of the voltage ranges between adjacent reference voltages, between the minimum voltage 827 and reference voltage zero 829, and between reference voltage three 832 and maximum voltage 828. For example a voltage falling between reference voltage three 832 and maximum voltage 828 corresponds to a logic value of three. Voltages falling between reference voltage three 832 and reference voltage two 831 correspond to a logical value of two. Voltages falling between reference voltage two 831 and reference voltage one 830 correspond to a logical value of one. Voltages falling between reference voltage one 830 and reference voltage zero 829 correspond to a logical value of zero. Voltages falling between reference voltage zero 829 and minimum voltage 827 correspond to a control value of zero. It will be appreciated that the ratio of logic values to control values may be altered to fit the requirements of a particular application.

While previous examples have dealt solely with multi-value signals corresponding to logic values, it is possible for multi-value signals to take on logic or control values. In the example of four logic values and one control value, the control value may be thought of as a fifth, or 'penta' value. The multi-value signal may enter and exit the voltage range associated with this control state as its voltage varies over time. For example, at time one 833 multi-value signal 826 has a voltage between minimum voltage 827 and reference voltage zero 829. Accordingly, at time zero 833, multi-value signal 826 is associated with control value zero. At time two 834, multi-value signal 826 has a voltage between reference voltage zero 829 and reference voltage one 830. Accordingly, multi-value signal 826 would be interpreted to have a logical value zero. At time three 835, multi-value signal 826 has a voltage between reference voltage one 830 and reference voltage two 831. Accordingly, multi-value signal 826 would be interpreted to have a logical value one. Advantageously, the present systems allow a multi-value signal to have either control or logical values depending on its voltage. Control information can be sent on data lines without the need for accompanying lines or other signals or systems indicating that the signal on the date line contains control information. Embedding control information onto a data line in this manner can enable significant reductions in wiring, crosstalk, and other circuit design problems.

Referring now to FIG. 14-B, system 850 for interpreting logic and control values of multi-value signals is illustrated. It will be appreciated that multi-value driver for logic and control 851 functions similarly to multi-value driver 51 from FIG. 2. However, multi-value driver for logic and control 851 has been augmented to include both logic and control outputs. Multi-value driver for logic control 851 comprises an array of sense amps 852 an array of decoders 857. Each individual sense amp has three inputs. For example, sense amp 853 has a multi-value signal 867, the highest reference voltage from reference voltages 868, and clock inputs 869 as inputs. Multi-value driver for logic and control 851 has five outputs 861. Four outputs are interpreted as logic values. One output 866 is interpreted as a control output. It will be appreciated the number of outputs may be altered by adding or removing reference voltages, sense amps, and decoders. It will also be appreciated that the ratio of logic value outputs to control value outputs may be altered. In a particular example, sense amp 853 receives the highest reference voltage of reference voltages 860 as an input. Responsive to clock signals 869, sense amp 853 compares the input reference voltage with multi-value signal 867. It will be appreciated that since amp 853 is similar to sense amp 102 from FIG. 3 and will not be described in detail. However, generally sense amp 853 compares the voltage of multi-value signal 867 to its reference voltage input. If the multi-value signal 867 has a higher voltage than the reference voltage 868, sense amp 853 activates an output 855 indicating that the multi-value signal had a higher voltage. As before, this may be referred to as a token high output. In this case where sense amp 853 uses the highest reference voltage and logic three corresponds to the highest voltage range, the token high output corresponds to the logic three output 862. If, however, the multi-value signal 867 has a lower voltage than the reference voltage input to sense amp 853, the sense amp activates an output 859 indicating that the multi-value signal 867 had a lower voltage. As before, this may be referred to as a reference high output. In one example, sense amp 853 determines the multi-value signal input 867 is lower than the highest reference voltage input 868 and activates reference high output 859. At the same time sense amp 854 determines that multi-value signal 867 is higher than the next highest reference voltage 868 and activates token high output 860. Decoder 858 will combine the outputs of the sense amps to determine that the multi-value signal input falls between the two highest reference voltages. In the present example, the voltage range between the two highest reference voltages is associated with a logic value of two and logic two output 863 will be activated. If multi-value signal 867 is lower in voltage than the lowest reference voltage 868, sense amp 856 will activate its reference high output 864. In this example, the lowest voltage range has been associated with control value zero and control zero output 866 will be activated. It will be appreciated that the assignment of a particular control value to a particular voltage range may be selected to fit a particular application. In one example, the voltage range closest to ground is selected as a control value to facilitate powering off circuitry as will be discussed herein. It will be appreciated that outputs 861 are mutually exclusive. In other words, one and only one of outputs 861 is active at a given time. Advantageously, the present system enables both logic and control values to be communicated on a single line without the need for extra control signals on other lines or other complex encoding schemes. As a result, less wiring to bulky messaging systems are needed in system design and implementation.

Figure 15:
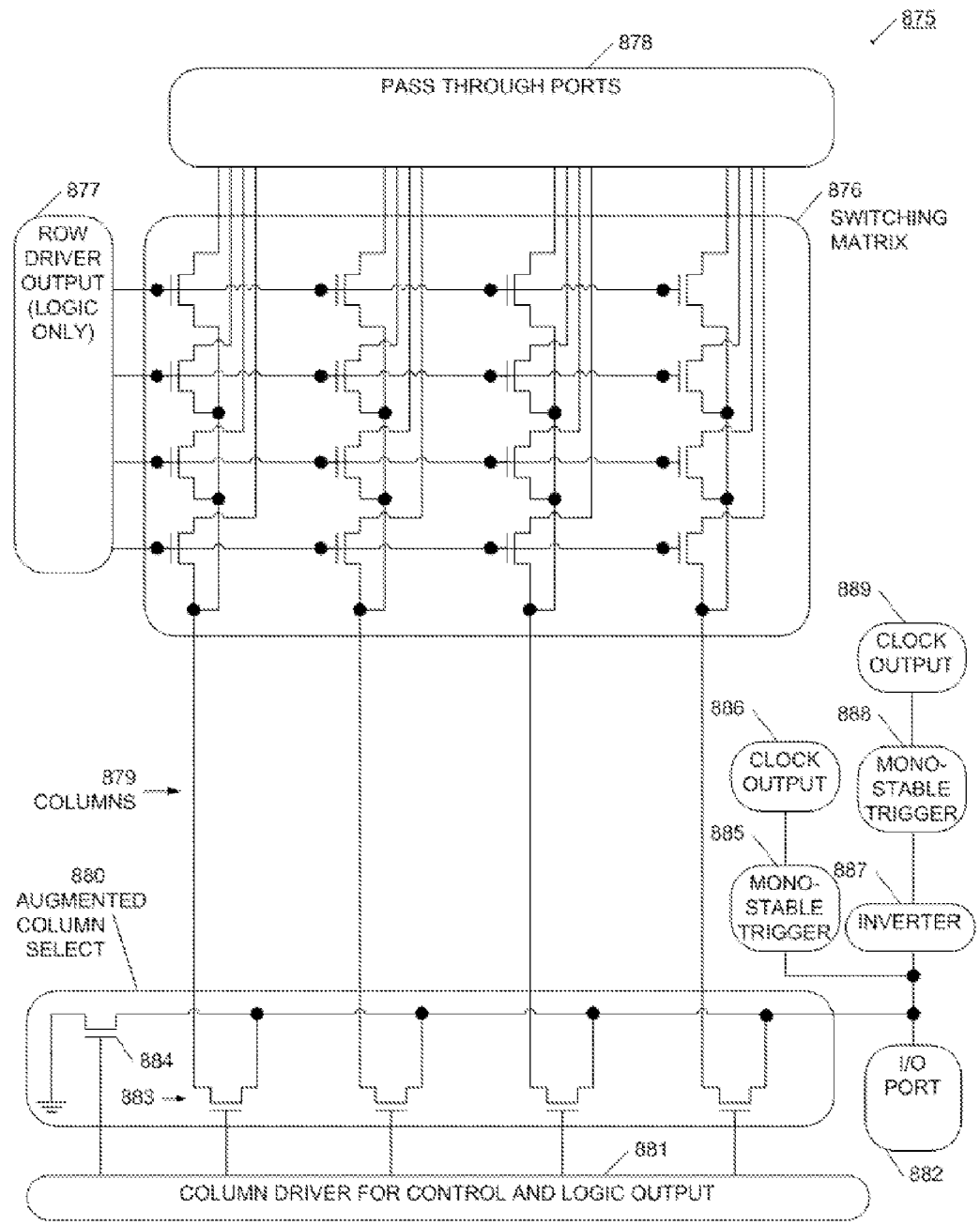
FIG. 15 is a block diagram of a multi-value logic circuit for utilizing signals with logical and control values.

Referring now to FIG. 15, system 875 for enabling independent clocking of logic blocks is illustrated. It will be appreciated the elements of system 875 are similar to corresponding elements of system 200 illustrated in the FIG. 5. As such, the functionality of those elements will not be described in great detail. System 875 has switching matrix 876. It will be appreciated that switching matrix 876 is similar to switching matrix 202 from FIG. 5. Generally switch matrix 876 uses row driver outputs 877 to functionally connect a subset of pass-through ports 878 to columns 879. It will be appreciated that in this example the row driver outputs 877 are generated by a multi-value driver generating logic value outputs and not control value outputs. In another example, the row driver could be a driver generating both logic and control value outputs. Row driver outputs 877 will have exactly one active line. In this example, the activated output line will cause a series of n-type transistors to open up connecting four of the pass through ports 878 to columns 879. It will be appreciated that while four logical values have been used in connection with the present example, it is possible to use a greater smaller numbers of logical values and correspondingly increase or decreases the number of pass-through ports, row, and columns. It will be further appreciated that while n-type transistors have been used, other combinations and types of transistors could be used to meet the needs of a particular situation. System 875 also has an augmented column select circuit 880 which uses column driver outputs for logic and control 881 to connect one or none of columns 879 to I/O port 882. Augmented column select 880 has a series of column n-type transistors 883. Each of these column transistors corresponds to a logical value output from column driver for outputs 881. When one of the logic values from column driver outputs 881 is active, one of n-type transistors 883 is opened up and one of the columns 879 is connected to I/O port 882. However, when the control output from column driver outputs 881 is active and n-type transistor 884 is opened up, I/O port 882 is connected directly to ground. Again will be appreciated that while n-type transistors are use in augmented column select 880, alternative configurations and types of transistors can be used depending on the situation. For example, p-type transistors or pass gates could be used. When n-type transistor 884 is activated, each of columns 879 is functionally isolated from I/O port 882 by n-type column transistors 883. This follows by virtue of the mutual exclusivity of the logic and control outputs of column driver outputs 881. System 875 may be used to generate clock signals for other circuits. For example, it may be that the control output from column driver for logic and control output 881 has been active for some time. In this case the gate of transistor 884 would be open and I/O port 882 would be connected directly to ground. At a subsequent time, the input to the column driver may change so that the column driver output 881 has an active logic value output. Accordingly, the I/O port 882 would no longer be connected to ground through transistor 884. The I/O port 882 would be functionally connected to one of the columns 879 and through the switching matrix 876 to one of the pass through ports. If the voltage on that pass through port 878 is a logical value, the value on I/O port 882 will switch from being ground to that logical value. System 875 has mono-stable triggers 885 and 888 connected to I/O port 882. The input to mono-stable trigger 888 is inverted from the input to mono-stable trigger 885. The functionality of these mono-stable triggers will be discussed relative to FIG. 16. However, generally mono-stable triggers 885 and 888 are used to generate clock outputs 886 and 889 responsive to changes in voltage at I/O port 882. For example, in response to a change from a control value to a logical value, mono-stable trigger 885 may generate a pulse. This pulse may be used as a clock output 886 that could be subsequently used as a clock input to another circuit. In another example, the pulses generated by the mono-stable triggers may be used as interrupt requests or for power purposes. Advantageously present system enables independent clocking a logical blocks. Individual logic circuits can receive and generate clock signals independently of master clock. This may reduce power consumption and timing concerns inherent in using a synchronous and common clock for multiple logic blocks.

Figure 16:
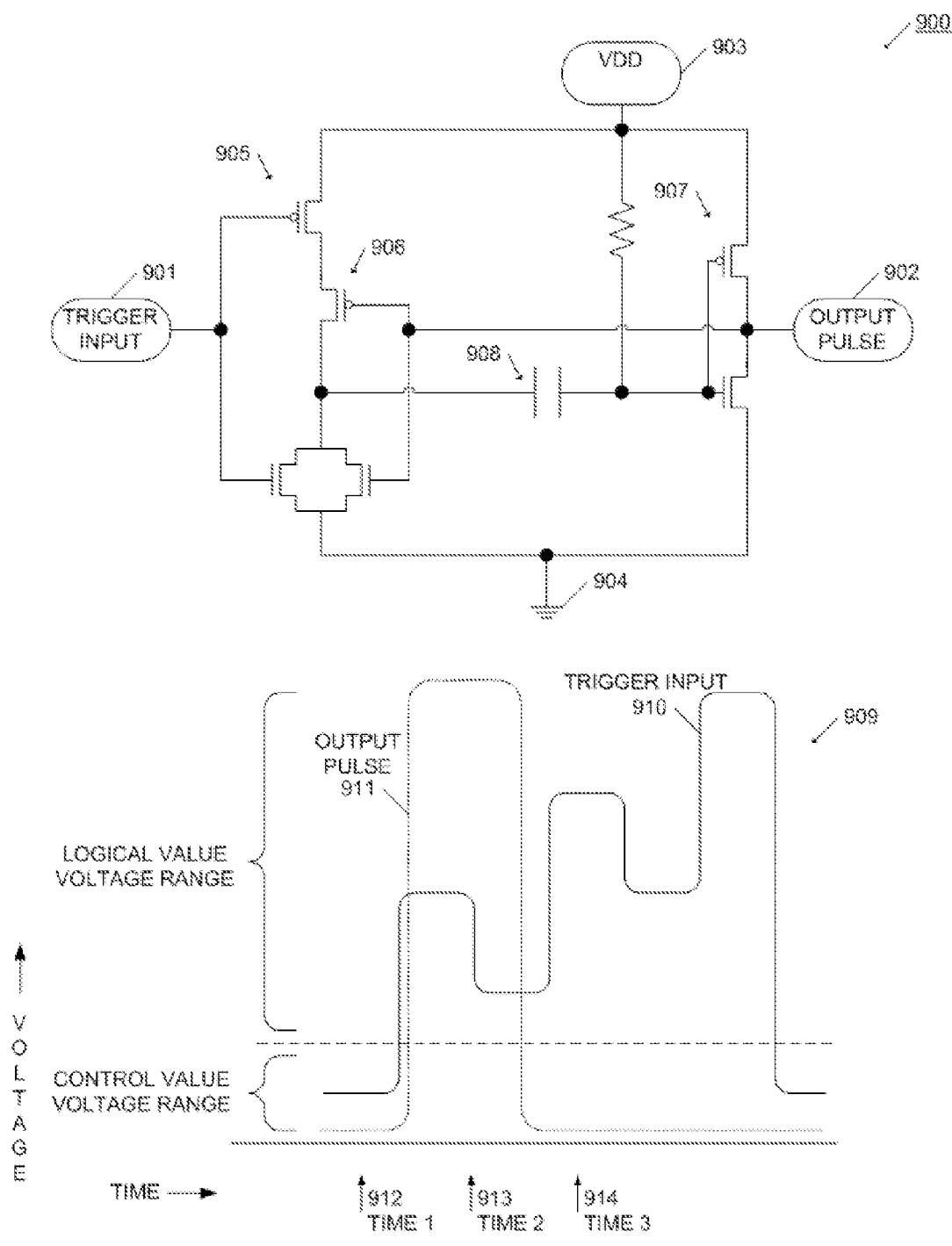
FIG. 16 is a block diagram and wave form describing a mono-stable trigger.

Referring now to FIG. 16, mono-stable trigger 900 and an associated wave form are illustrated. It will be appreciated that mono-stable triggers are known in the art and will not be described in great detail here. However, generally, mono-stable triggers react to a change in the voltage at a trigger input 901. Certain changes in the voltage at the trigger input will cause the mono-stable trigger to emit an output pulse 902. In this example of a mono-stable trigger, three inverter pairs 905, 906, and 907 are combined with a capacitor 908 to achieve the functionality depicted in wave form 909. For the purpose of explanation, the voltage at the trigger input 910 is assumed to begin at or near ground at time 1 912. In one example, a voltage near ground is interpreted as a control value. At time 1 912 when the voltage at the trigger input is below a certain threshold, the output pulse 911 has is at or near ground as well. At time 2 913 when the voltage at the trigger input 901 increases past a certain threshold, the transistors of inverter pair 905 roll over. As a result, the both other inverter pairs 906 and 907 roll over as well. When inverter pair 907 rolls over, output pulse 902 is connected directly to VDD and the voltage at output pulse 902 moves from near ground to near VDD. When inverter pairs 906 and 907 roll over, capacitor 908 also begins accumulating charge. At some point before or at saturation, capacitor 908 will cause inverter pair 907 to roll over again. When inverter pair 907 rolls over again, the voltage at output pulse 902 will return to a voltage near or at ground. It will be appreciated that the dimensions and other characteristics of the transistors may be altered to change the threshold voltages at which the inverter pairs roll over. Further, adjusting the power supply voltages, capacitances, and resistances can change the behavior of the circuit to match certain design requirements. In one example, the characteristics of the circuit elements are arranged so that the threshold voltage at which the mono-stable trigger will output a pulse is the voltage which defines the boundary between control values and logic values. Advantageously, this scheme would allow the transition from a control value to a logic value to be used to trigger functionality in other circuits. For example, the output pulse could be used as a clock signal for subsequent logic blocks as will be described in relation to FIG. 17.

Figure 17:
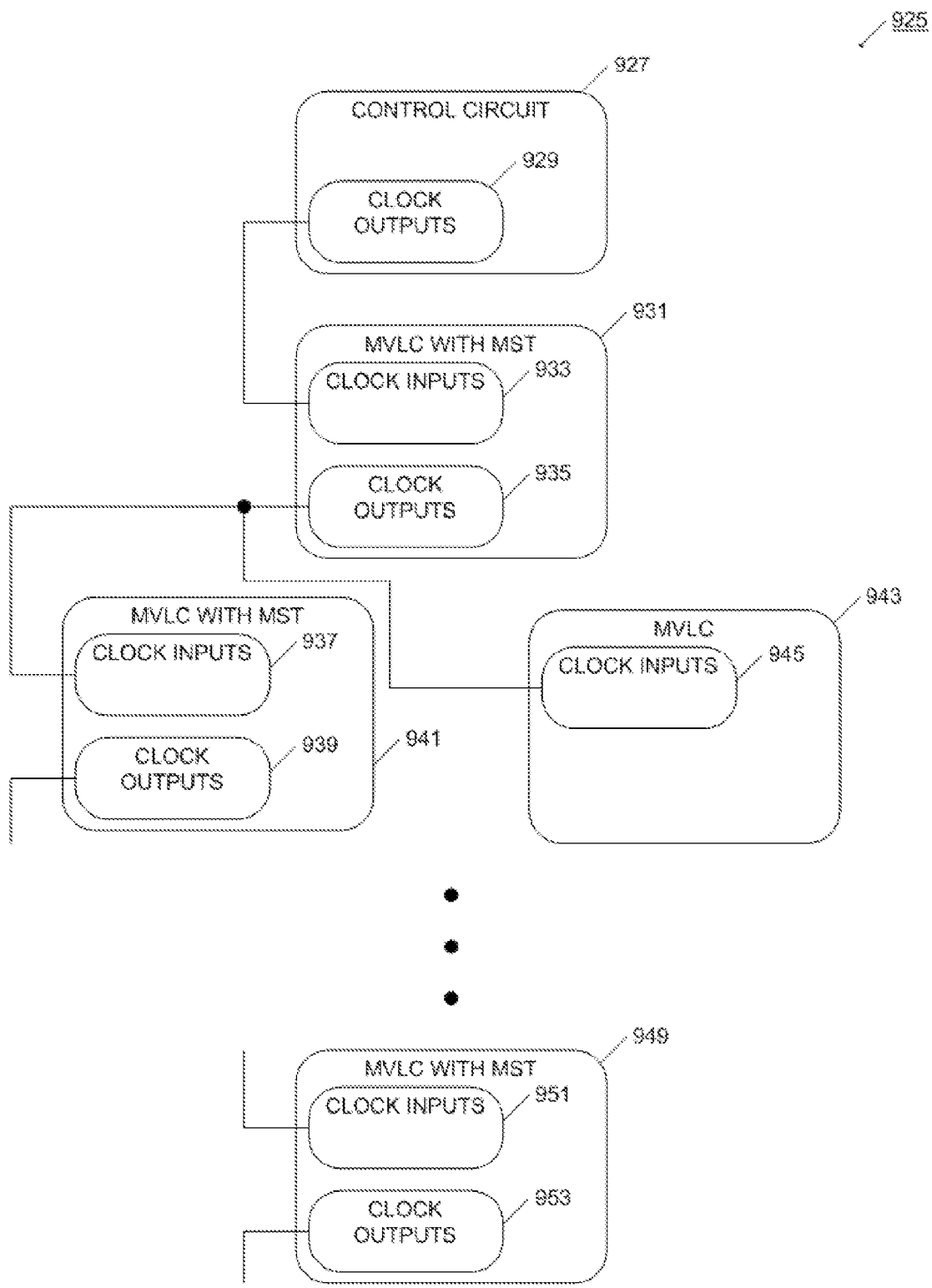
FIG. 17 is a block diagram of a system utilizing asynchronous clocking of logic blocks.

Referring now to FIG. 17, system 925 for independent clocking of logic blocks is illustrated. System 925 has general control circuitry 927. This control circuitry 927 represents control logic in a processor. Control circuit 927 has clock outputs 929. It will be appreciated that while control circuit 927 may operate according to a standard clocking scheme, clock outputs 929 and need not coincide with the clocking scheme used by control circuitry 927. System 925 has MVLC with mono-stable triggers (MST) 931. It will be appreciated that the functionality of MVLC with MST 931 is similar to the functionality of system 875 described in relation to FIG. 15 and will not be discussed in great detail here. However, generally, MVLC with MST 931 performs a logic function like any other MVLC. Unlike a standard MVLC however, MVLC with MST 931 also generates a set of clock outputs 935. System 925 has additional MVLC's 941, 943, and 949. In one example, the MVLC's of system 925 represent circuitry for accomplishing a particular logic function and produce an output. Control circuit 927 generates clock outputs 929 and supplies any necessary operands to start the computation of the logic function. It will be appreciated that clock outputs 929 do not have to be any more complex than a single pulse. MVLC with MST 931 receives the clock outputs 929 as its clock inputs 933 and performs its computation. Upon completion of the computation, MVLC with MST 931 generates its own clock outputs 935. These clock outputs 935 are used as the clock inputs for a new tier of MVLC's 941 and 943. The MVLC's at this tier complete their computations. The MVLC with MST at this tier generates clock outputs 939 which are used as clock inputs at the next tier. It will be appreciated that the number of MVLC's in any tier may be adapted to suit design parameters. However, in one example, one MVLC with MST is used at each tier to generate the clock inputs for the entire subsequent tier. The last tier takes the clock outputs from the previous tier as its clock inputs. In this example, an MVLC with MST 949 in the last tier also generates clock outputs 953. This last set of clock outputs 953 may be used as an interrupt request to the control circuitry 927 to indicate that the logic function has been computed and that the result is ready. In one example, the clock outputs generated at eac tier is a single pulse to trigger the operation of the subsequent tier. However, in another example, two pulses are generated as the clock output at each tier. The first pulse is used to clock in operands that may consist of logic values. The second pulse is to clock in control values to effectively clear the circuitry. This two pulse clocking scheme may facilitate piping and other sophisticated timing schemes. Advantageously control circuit 927 can asynchronously begin computation in different logic chains and retrieve information in each of the logic chains completes its computation of function. This functionality reduces the complexity of clocking across large areas of a chip and simplifies the design an implementation of logic systems.

Figure 18:
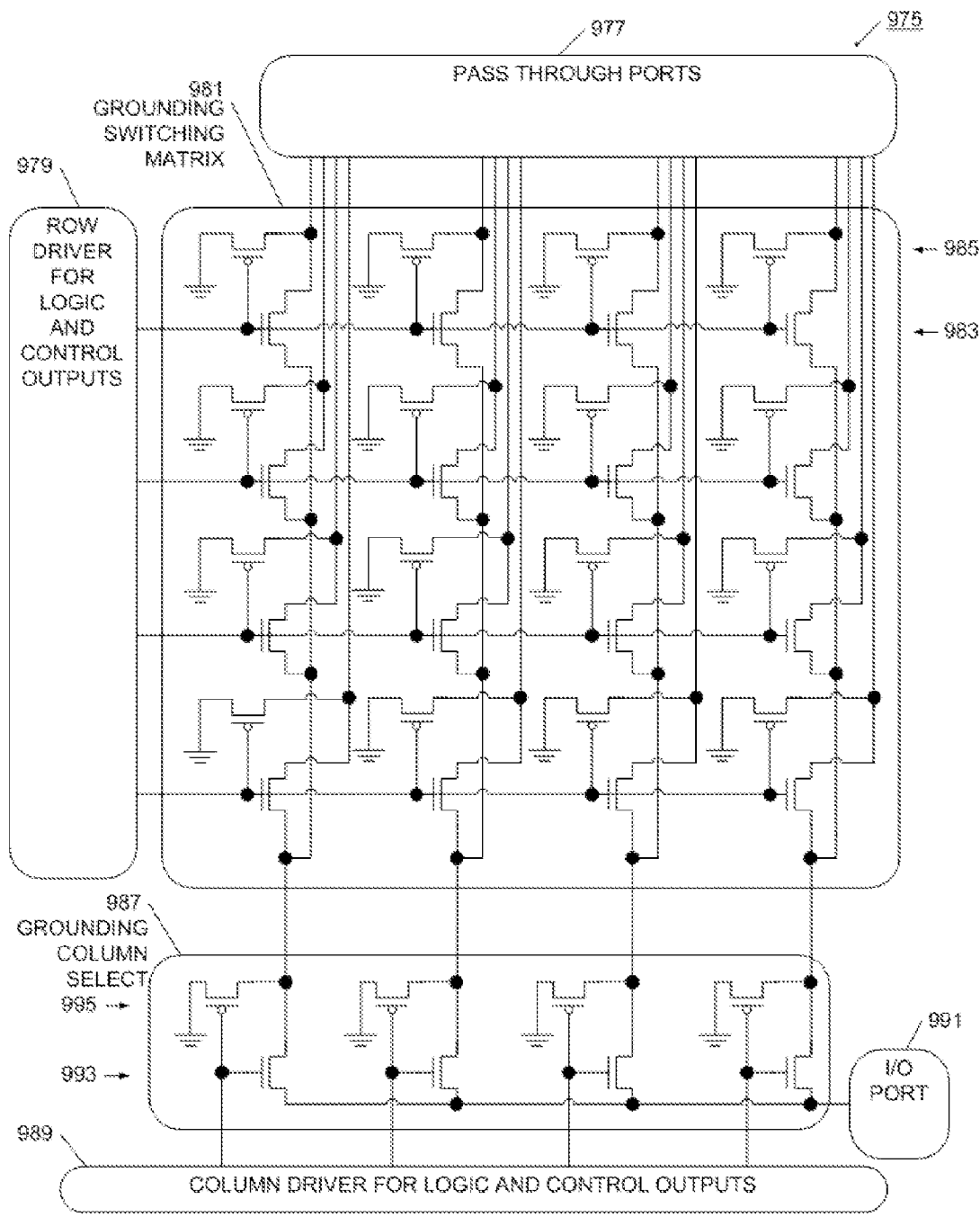
FIG. 18 is a block diagram of a multi-value flow controller for reducing power consumption.

Referring now to FIG. 18, system 975 for multi-value logic and power conservation is illustrated. In one example, system 975 is referred to as a grounding MVFC. It will be appreciated that system 975 is similar to MVFC 200 described in relation to figure. As such, the functionality of system 975 will not be described in great detail. However, generally, system 975 is useful in routing signals. System 975 has a plurality of pass through ports 977. As with other examples described herein, the exemplary system 975 uses of four distinct logical values. As such, sixteen pass through ports are used. It will be appreciated that all examples used herein could be adapted to use for two, four, ten, or other numbers of logical values. In each case, the number of pass through ports would be adapted. The pass through ports 977 pass into grounding switching matrix 981. Grounding switching matrix 681 functions in a manner similar to switching matrix 202 in FIG. 5. Generally, each switching matrix functionally connects a subset of the pass through ports to a number of columns. The outputs from a row driver for are used to turn on a series of n-type transistors that connect the subset of pass through ports to the columns. In the switching matrix 202 of FIG. 5, the three inactive row lines do not to connect the remaining pass though ports to the columns and those unconnected pass through ports are left floating. Grounding matrix 981 has an extra p-type transistor for each pass through port. If the row line associated with a pass through port is not activated, the p-type transistor opens up and the pass through port is connected directly to ground. Generally, each row is associated with a different logic value. It will be appreciated that system 975 also uses row driver that can generate logic and control values. In the case where the input to a row driver is a control value, none of the row lines associated with logic values will be activated and all of the pass-through ports will be connected directly to ground. System 975 also has a grounding column select 987. Like the grounding switching matrix 981, the grounding column select 987 connects any inactive column directly ground. The grounding column select 987 also receives its inputs from a column driver that can generate logic and control values. When a control value is presented to the column driver, all of the columns associated with logical values are connected directly to ground. When a logical value is presented to both the row and column driver, the I/O port is connected to exactly one pass through line and all the other pass through lines are connected to ground. It will be appreciated that the specific configurations of p-type and n-type transistors is exemplary and other arrangements of transistors could be used. Advantageously, the present system powers down in response to receiving a control value at either the row or column driver. When integrated into a larger steering system, this power down functionality can result in significant power savings.

Figure 19:
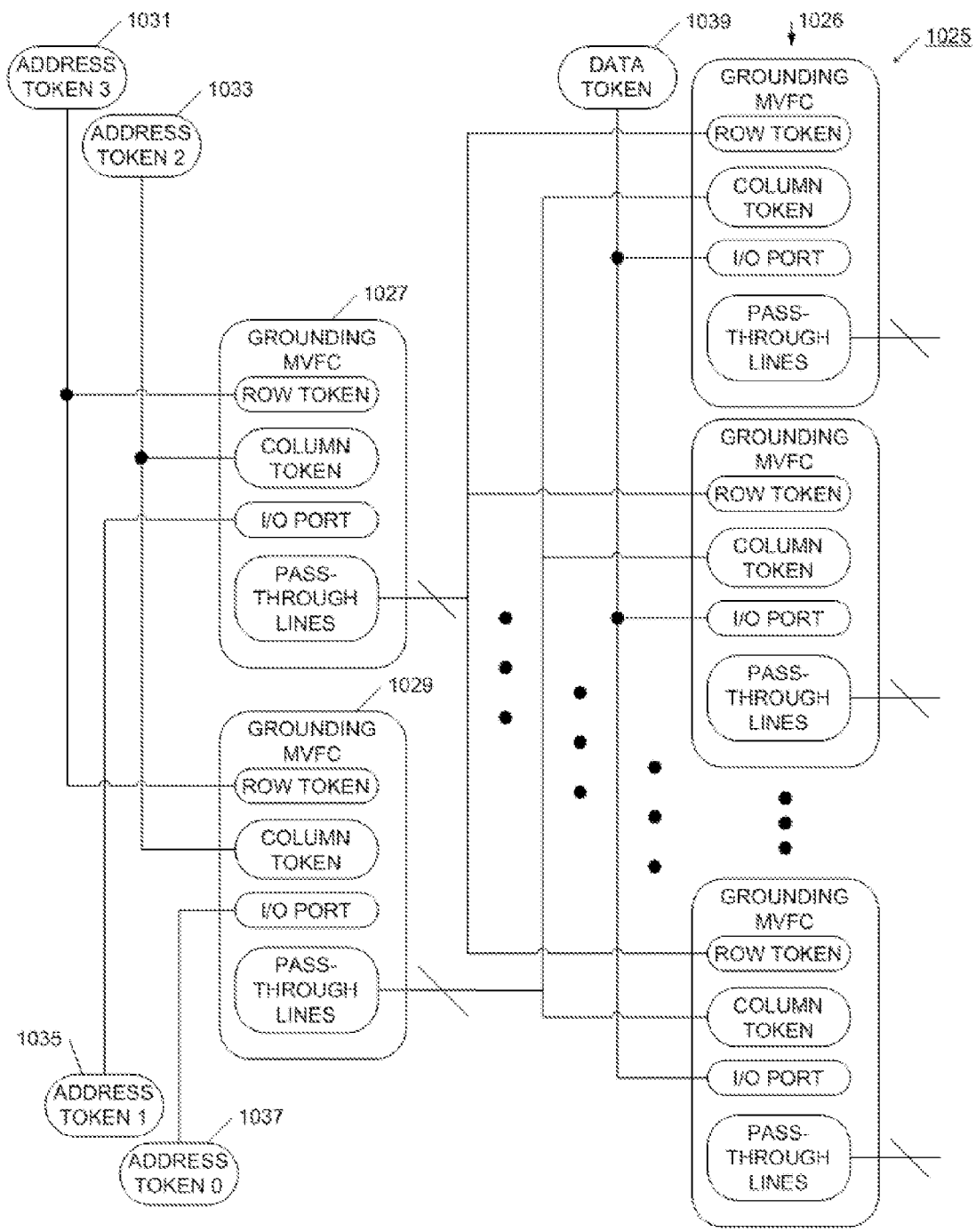
FIG. 19 is a block diagram of a system for steering data with reduced power consumption.

Referring now to FIG. 19, system 1025 for low power data steering is illustrated. System 1025 is an example of how grounding MVFC's like those described in relation to FIG. 18 can be connected to form larger steering arrays. System 1025 uses two tiers of grounding MVFC's to decode an a address of four multi-value signals or tokens and drive a data signal onto one of 256 lines. Again, while the example of MVFC's that use four logic values is maintained here, other numbers of logic values could be used. Similarly, larger or smaller arrays could be created to drive data between more or fewer lines. The most significant address tokens 1031 and 1033 are used as the row and column tokens for grounding MVFC's 1027 and 1029. The two least significant address tokens are provided as inputs at the I/O ports of grounding MVFC's 1027 and 1029. After being clocked, each grounding MVFC drives the address token at its I/O port onto one of its sixteen pass through lines. The other fifteen pass through lines of each MFVC are connected to ground as described in relation to FIG. 18. At the next tier of grounding MVFC's 1026, fifteen of the sixteen MVFC's receive grounded pass through lines to their row and column token inputs. In the example where ground represents a control value, every pass through line of each of those grounding MVFC's is driven to ground as well. One of the sixteen grounding MVFC's in the second tier 1026 will receive the two least significant address tokens for its row and column token inputs. This MVFC will take the data token at its I/O port and drive it onto one of the sixteen pass through ports. The other fifteen will be connected to ground. As a result, the data token ends up on one of 256 lines while the other 255 are grounded. If the process is repeated with a new address, at least 254 of the pass through lines will remain grounded the entire time. Advantageously the present system allows data to be driven onto one of many lines with minimal power consumption.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method of interpreting multi-value signals, comprising:
    interpreting a multi-value signal as a logical value when its voltage is in a first range;
    interpreting the multi-value signal as a control value when its voltage is in a second range that is outside the first range;
    generating an interrupt request in response to receiving a multi-value signal with a voltage corresponding to the control value.

2. A multi-value driver, comprising:
    a set of reference voltage inputs;
    a token input;
    a clock input;
    a set of logical value outputs;
    a set of control value outputs; and, a set of sense amps and decoders for comparing the token input to the reference voltage inputs and activating one of the logical or control value outputs responsive to the comparison.

3. The driver of claim 2, wherein the activation of a control value output causes a circuit to be powered up or powered down.

4. The driver of claim 2, wherein the activation o fa control value output causes a set of clock signals to be generated.

5. The driver of claim 2, wherein the activation of a control value output causes an interrupt request to be generated.

6. A multi-value circuit, comprising:
a plurality of pass-through lines;
an I/O port;
a set of input tokens;
a clock input;
a set of multi-value drivers for associating a logical or control value with each input token responsive to the clock input; and,
a nodal array and column select circuit for functionally connecting one or none of the pass-through lines to the I/O port responsive to the values associated with the input tokens.

7. The multi-value circuit of claim 6, further comprising a set of mono-stable triggers connected to the I/O port.

8. The multi-value circuit of claim 7, wherein the set of mono-stable triggers is used to generate a set of clock signals.

9. The multi-value circuit of claim 8, wherein the set of clock signals form a clock input for another circuit.

10. The multi-value circuit of claim 8, wherein a clock signal is generated when a voltage at the I/O port transitions from a control value to a logic value.

11. The multi-value circuit of claim 8, wherein a clock signal is generated when a voltage at the I/O port transitions from a logic value to a control value.

12. The multi-value circuit of claim 8, wherein a clock signal is generated when a voltage at the I/O port transitions from a logic value to a control value and when a voltage at the I/O port transitions from a control value to a logic value.

13. The multi-value circuit of claim 7, wherein the set of mono-stable triggers is used to generate an interrupt request.

14. The multi-value circuit of claim 6, wherein the I/O port is functionally connected to ground ifone or more of the input tokens is associated with a control value.

15. The multi-value circuit of claim 6, wherein the passthrough lines not functionally connected to the I/O port are functionally connected to ground.

\* \* \* \* \*